(12) United States Patent
DeMille et al.

(10) Patent No.: US 12,420,151 B2
(45) Date of Patent: Sep. 23, 2025

(54) GOLF CLUB HEAD WITH BINDER JET PRINTED LATTICE SUPPORT STRUCTURES

(71) Applicant: Callaway Golf Company, Carlsbad, CA (US)

(72) Inventors: Brandon D. DeMille, Carlsbad, CA (US); Brian Hoffarth, Vista, CA (US); Dominic LeBlanc, Carlsbad, CA (US); William C. Watson, Menifee, CA (US); Irina Ivanova, Poway, CA (US)

(73) Assignee: Topgolf Callaway Brands Corp., Carlsbad, CA (US)

( * ) Notice: Subject to any disclaimer, the term of this patent is extended or adjusted under 35 U.S.C. 154(b) by 682 days.

(21) Appl. No.: 17/895,770

(22) Filed: Aug. 25, 2022

(65) Prior Publication Data

US 2022/0401799 A1 Dec. 22, 2022

Related U.S. Application Data

(63) Continuation-in-part of application No. 17/740,394, filed on May 10, 2022, now Pat. No. 12,239,889, (Continued)

(51) Int. Cl.
*A63B 53/04* (2015.01)
*A63B 102/32* (2015.01)
*B33Y 80/00* (2015.01)

(52) U.S. Cl.
CPC ........ *A63B 53/045* (2020.08); *A63B 53/0416* (2020.08); *A63B 53/0433* (2020.08);
(Continued)

(58) Field of Classification Search
CPC ............ A63B 2102/32; A63B 53/0475; A63B 53/0466; A63B 53/0437; A63B 53/0433;
(Continued)

(56) References Cited

U.S. PATENT DOCUMENTS 4,336,296 A * 6/1982 Fukuta ................. D03D 41/004
442/205
5,401,021 A 3/1995 Allen
(Continued)

OTHER PUBLICATIONS

Non-Final Office Action dated Sep. 16, 2021, regarding U.S. Appl. No. 17/327,483, filed May 21, 2021.
(Continued)

*Primary Examiner* — Sebastiano Passaniti
(74) *Attorney, Agent, or Firm* — Michael A. Catania

(57) ABSTRACT

Golf club components with complex structures such as lattice structures, beam structures, and complex surface-based structures, are described herein. A binder jet machine is used create complex structures within these golf club components to optimize weighting, sound, and performance of golf club heads. These components may be manufactured using a method that includes the steps of designing a golf club head component in CAD using optimization software, printing the component from a powdered material, and then removing excess powder from the component via port holes that extend into an external surface of the component and communicate with interior voids within the component.

5 Claims, 33 Drawing Sheets

Related U.S. Application Data which is a continuation of application No. 17/327,483, filed on May 21, 2021, now Pat. No. 11,331,544.

(60) Provisional application No. 63/166,028, filed on Mar. 25, 2021.

(52) U.S. Cl.
CPC ...... *A63B 53/0437* (2020.08); *A63B 53/0466* (2013.01); *A63B 53/0475* (2013.01); *A63B 53/0487* (2013.01); *A63B 2102/32* (2015.10); *B33Y 80/00* (2014.12)

(58) Field of Classification Search
CPC .............. A63B 53/0416; A63B 53/045; A63B 53/0487; B33Y 80/00
USPC ................... 473/324–350, 287–292
See application file for complete search history.

(56) References Cited

U.S. PATENT DOCUMENTS

| | | | | |
|---|---|---|---|---|
| 7,318,782 | B2 * | 1/2008 | Imamoto | A63B 53/0466 473/347 |
| 7,828,672 | B2 * | 11/2010 | Billings | A63B 53/04 473/335 |
| 8,579,724 | B2 * | 11/2013 | Evans | A63B 60/00 473/349 |
| 9,925,432 | B2 * | 3/2018 | Morales | A63B 60/02 |
| 10,343,301 | B2 | 7/2019 | Day | |
| 10,835,791 | B1 * | 11/2020 | Frederickson | A63B 53/08 |
| 11,771,961 | B2 * | 10/2023 | Brubaker | A63B 53/0408 473/349 |
| 2002/0128089 | A1 * | 9/2002 | Sillers | A63B 60/02 473/335 |
| 2007/0155533 | A1 * | 7/2007 | Solheim | A63B 53/0466 473/345 |
| 2007/0243950 | A1 | 10/2007 | Billings | |
| 2012/0178550 | A1 | 7/2012 | Solheim | |
| 2013/0337932 | A1 | 12/2013 | Kammerer | |
| 2017/0014690 | A1 * | 1/2017 | Morin | A63B 60/52 |
| 2017/0340932 | A1 * | 11/2017 | Morales | A63B 53/0466 |
| 2018/0326266 | A1 * | 11/2018 | Mardinly | A63B 53/04 |
| 2019/0009458 | A1 * | 1/2019 | Li | B32B 3/085 |
| 2019/0091895 | A1 | 3/2019 | Knappworst | |
| 2019/0231018 | A1 | 8/2019 | Boutin | |
| 2020/0171753 | A1 | 6/2020 | Satco | |

OTHER PUBLICATIONS

Non-Final Office Action dated Mar. 22, 2022 regarding U.S. Appl. No. 17/327,502, filed May 21, 2021.
Final Office Action dated Jul. 20, 2022 regarding U.S. Appl. No. 17/327,502, filed May 21, 2021.

* cited by examiner

GOLF CLUB HEAD WITH BINDER JET PRINTED LATTICE SUPPORT STRUCTURES

CROSS REFERENCES TO RELATED APPLICATIONS

The present application is a continuation-in-part of U.S. patent application Ser. No. 17/740,394, filed on May 10, 2022, which is a continuation of U.S. patent application Ser. No. 17/327,483, filed on May 21, 2021, and issued on May 17, 2022, as U.S. Pat. No. 11,331,544, which claims priority to U.S. Provisional Application No. 63/166,028, filed on Mar. 25, 2021, the disclosure of each of which is hereby incorporated by reference in its entirety herein.

STATEMENT REGARDING FEDERALLY SPONSORED RESEARCH OR DEVELOPMENT

Not Applicable

BACKGROUND OF THE INVENTION

Field of the Invention

The present invention relates to methods of manufacturing golf club components with complex structures that are difficult, impossible, or cost prohibitive to produce via prior art methods, such as cell-based lattice patterns, beam-based structures, and complex surface-based structures, and golf club components, including golf club heads, manufactured to include such patterns and/or structures.

Description of the Related Art

Traditional manufacturing processes, which include investment casting, injection molding, compression molding, metal injection molding, forging, stamping, and forming place many constraints on the design of golf club heads and club head components, preventing manufacturers from fully customizing and optimizing their products. Some of these constraints include draw direction, taper, minimum wall thickness, draft angles, minimum radii, and maximum feature height.

Typical additive manufacturing techniques, also known as 3D printing, can eliminate or reduce the severity of these constraints, but have their own drawbacks. For example, direct metal laser sintering (DMLS), direct metal laser melting (DMLM), and electron beam additive manufacturing (EBAM) use controlled energy sources, including lasers and electron beams in which intense, extremely localized heat is applied to metal powder to melt and/or sinter adjacent particles together. This intense heat tends to cause warping, porosity (which creates inconsistent density throughout the part), distortion, surface defects, and even cracking of the parts during the build process, even when the laser intensity, focal length, and path speed are optimal.

Other characteristics of these techniques include using very small moving points to build parts, provide limited solutions for removing excess powder from the finished part, require significant post-processing to remove supports and support footprints on the surface, and require a very specific grade of metal powder (e.g., smaller than 40 microns, spherical particles) for high resolution and to guarantee an even sintering and a relatively smooth surface finish. These characteristics render these techniques suboptimal and cost-prohibitive for golf club manufacturing purposes.

The most significant drawback of the DMLS and DMLM techniques is the constraint they place on overhang angle, examples of which are shown in FIG. 41. As golf club parts are built, structures created by the prior art additive manufacturing techniques described above are not self-supporting, with thin beads of sintered material tending to sag and fall if they are not supported by connections to the build plate or another portion of the part that has already been fully sintered. As a result, a typical design requirement is that all surfaces be no more than 45° from the build axis, but the limit is typically 30-60°. The only alternative to the overhang angle design requirement is to add supports to the structure to help prevent sagging during the build process. The supports used for DMLS, DMLM, and EBAM are metal and are directly connected to the part, and are difficult to remove without negatively affecting the surface finish on the part or creating a large opening in the club head.

The overhang angle constraint dramatically limits the potential of otherwise promising designs that are based on modern generative design techniques like topology optimization. It also severely limits the types, orientations and sizes of cells that can be manufactured to form lattices. Even when a designer settles on a cell type that satisfies the overhang constraint, there is often no room for further optimization of the lattice via purposeful warping, skewing or otherwise stretching portions of the lattice to generate an improved design. It is also impractical to use metal supports to make fine lattice structures feasible to manufacture. If a lattice were to include overhanging beams and the beams are supported, the supports would be impossible to remove.

As described above, the prior does not provide additive manufacturing techniques that are optimized for creation of golf club components. Therefore, there is a need for a 3D printing method that creates high quality, high performing golf club heads and also allows for the easy removal of excess printing material.

BRIEF SUMMARY OF THE INVENTION

One aspect of the present invention is a golf club head comprising a face component, a body component comprising a sole, a crown, an insert with a lattice structure, and a weight, wherein the face component is affixed to the body component and to the crown, wherein the sole comprises a recess, and wherein the lattice structure is compressed within the recess between the sole and the weight.

In some embodiments, the lattice structure comprises a series of interconnected beams, each of which may have a circular cross-section, each of which may connect to another beam in a repeating pattern, and each end of each beam may be connected to at least one other beam. In a further embodiment, the lattice structure may comprise a plurality of geometric cells, at least 25% of which may have identical dimensions. In an alternative embodiment, at least 25% of the cells of the plurality of cells may have a characteristic different from all other cells of the plurality of cells, and the characteristic may be selected from the group consisting of size, aspect ratio, skew, and beam diameter.

In other embodiments, the recess may extend into an external surface of the sole, and the insert may be sized to fit within the recess. In a further embodiment, an external surface of the weight may be flush with the external surface of the sole when the insert is compressed within the recess between the weight and the sole. In another embodiment, the golf club head may further comprise a mechanical fastener, the sole may comprise at least one threaded opening sized to receive at least a portion of the mechanical fastener, and the mechanical fastener may affix the weight to the sole. In a further embodiment, the recess may be divided by at least one strut, and the at least one threaded opening may be disposed within the at least one strut.

In other embodiments, the weight may comprise a plurality of through-openings, and in a further embodiment, at least a portion of the insert may be visible through the through-openings. In another embodiment, the insert may comprise at least one curved surface, which may contact the weight. In still other embodiments, the weight may not contact any portion of the body component. In other embodiments, each of the sole and the crown may be composed of a non-metal material selected from the group consisting of plastic and composite, and the face component may be composed of a metal material.

In any embodiment, the insert may be binder jet printed from a non-metal material, and the lattice structure may comprise a plurality of geometric cells selected from the group consisting of simple cubic, body centered cubic, face centered cubic, diamond, Fluorite, octet, truncated cube, truncated octahedron, kelvin cell, isotruss, and Weaire-Phelan. In a further embodiment, the weight may comprise a tungsten alloy.

Another aspect of the present invention is a driver-type golf club head comprising a sole comprising a recess proximate an aft edge, a non-metal crown, a metal face component affixed to the crown and to the sole opposite the aft edge, a binder jet printed insert with a lattice structure, a metal weight comprising a plurality of through-openings, and at least one mechanical fastener, wherein the sole comprises at least one support strut that divides the recess, wherein the at least one support strut comprises at least one threaded opening, wherein the insert comprises at least one curved surface, wherein a portion of the at least one mechanical fastener extends through the weight to engage with at least one threaded opening and affix the weight to the sole, wherein the lattice structure comprises a plurality of non-ordered beams, each of which has a cross-sectional shape selected from the group consisting of circular and elliptical, wherein the lattice structure comprises a plurality of geometric cells comprising voids, a majority of which do not include any material, wherein the insert is compressed within the recess between the sole and the weight, wherein a portion of the insert is visible through at least one of the through-openings in the weight, wherein the at least one curved surface contacts the weight, and wherein no portion of the weight contacts the sole.

In some embodiments, each of the sole and the crown may be composed of a composite material, the face component may be composed of a metal material selected from the group consisting of steel and titanium alloy. In other embodiments, the insert may be composed of a non-metal material, and the lattice structure may comprise a uniform final material density of at least 90%. In other embodiments, the weight may be composed of a tungsten alloy. In alternative embodiments, the weight may be composed of a material selected from the group consisting of titanium alloy, steel, and aluminum alloy.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

The present invention is directed to improved methods of printing golf club components and golf club heads, and particularly the use of a binder jet machine to create complicated support structures from various materials that improve the support, mass distribution, and acoustics of the golf club heads, while allowing for the easy removal of unused powder. The present invention is also directed to golf club heads with components that are printed using the methods disclosed herein.

Binder Jet Process

Figure 1:
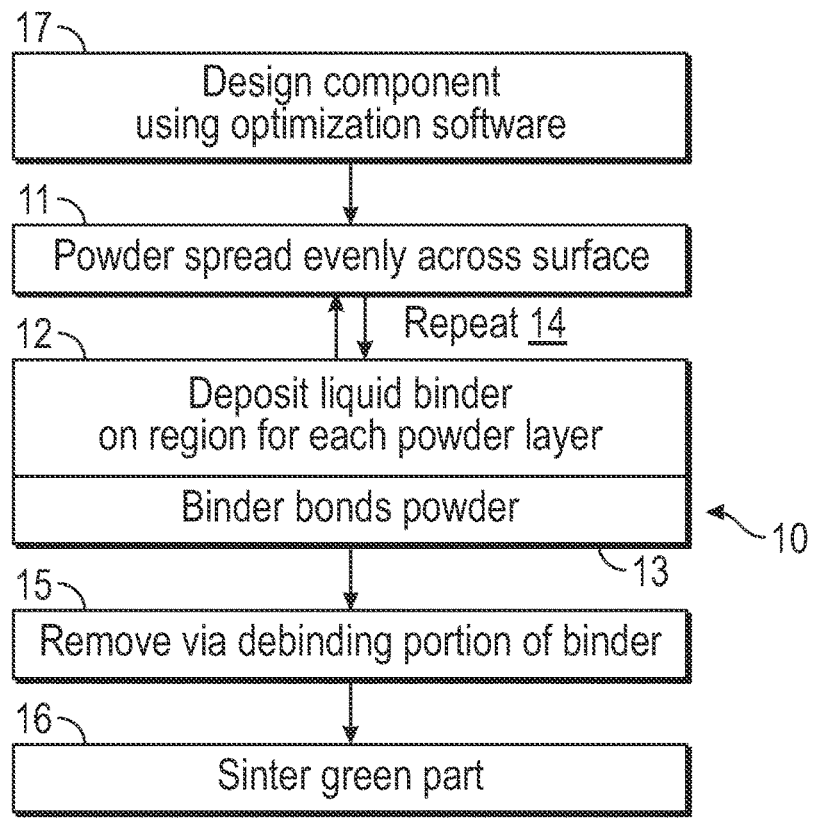
FIG. 1 is a process flow chart illustrating a binder jetting process.
Figure 2:
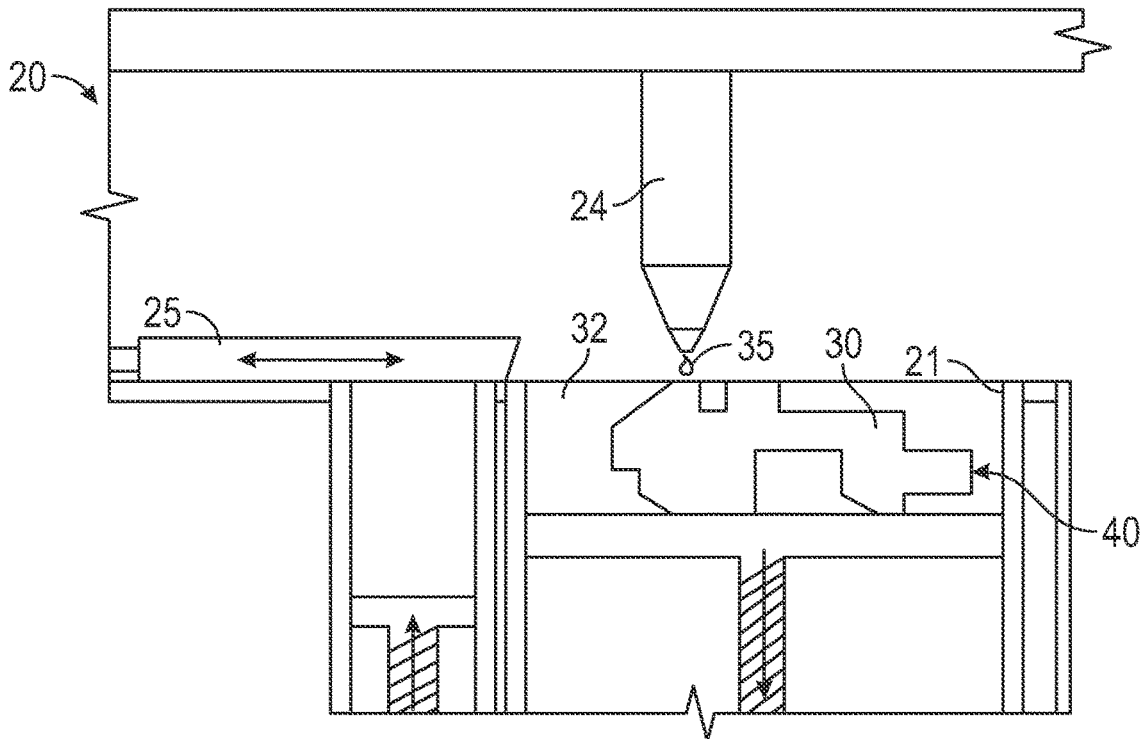
FIG. 2 is an image of an exemplary binder jet machine.
Figure 3:
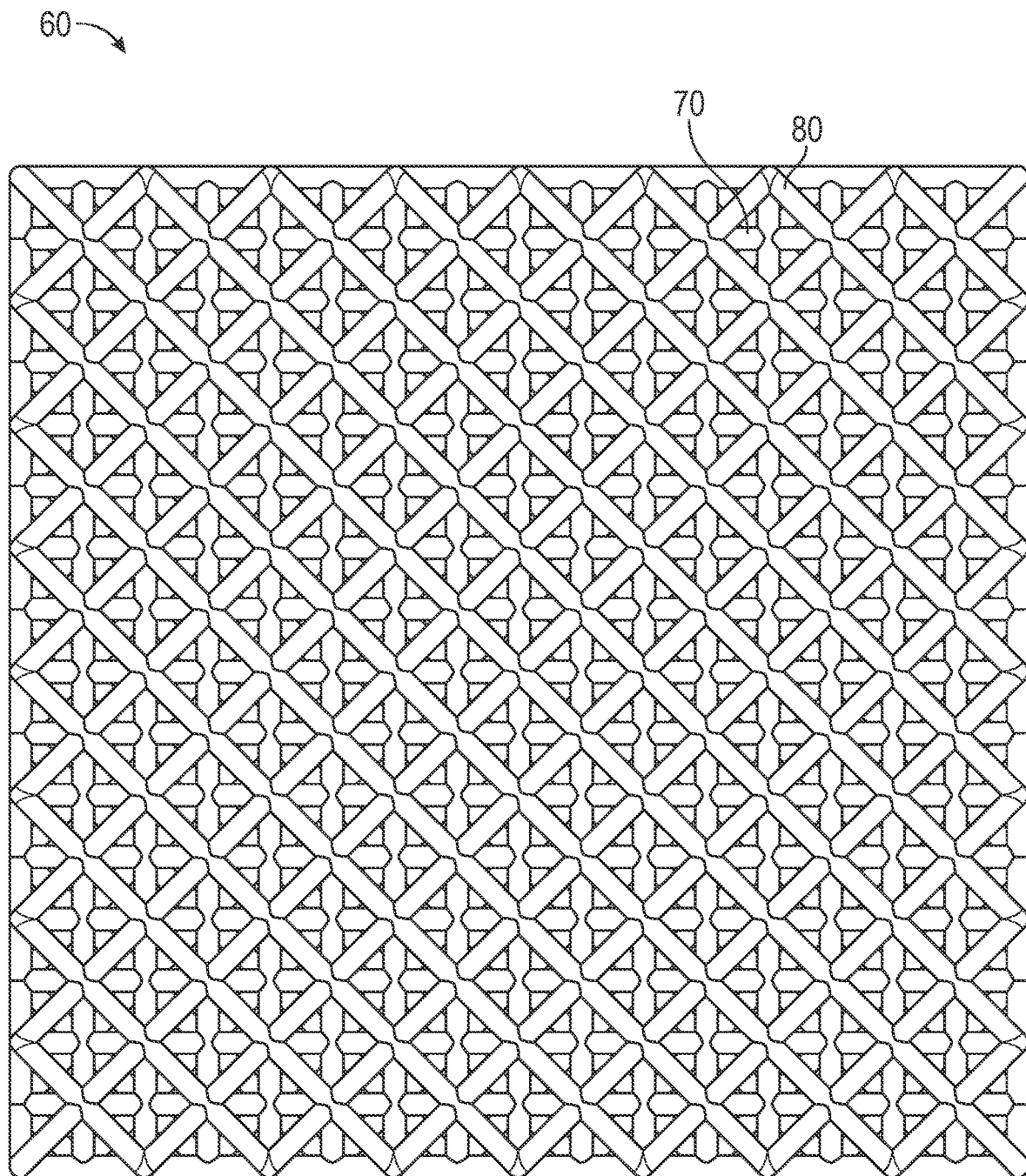
FIG. 3 is a top plan view of a uniform lattice pattern.
Figure 4:
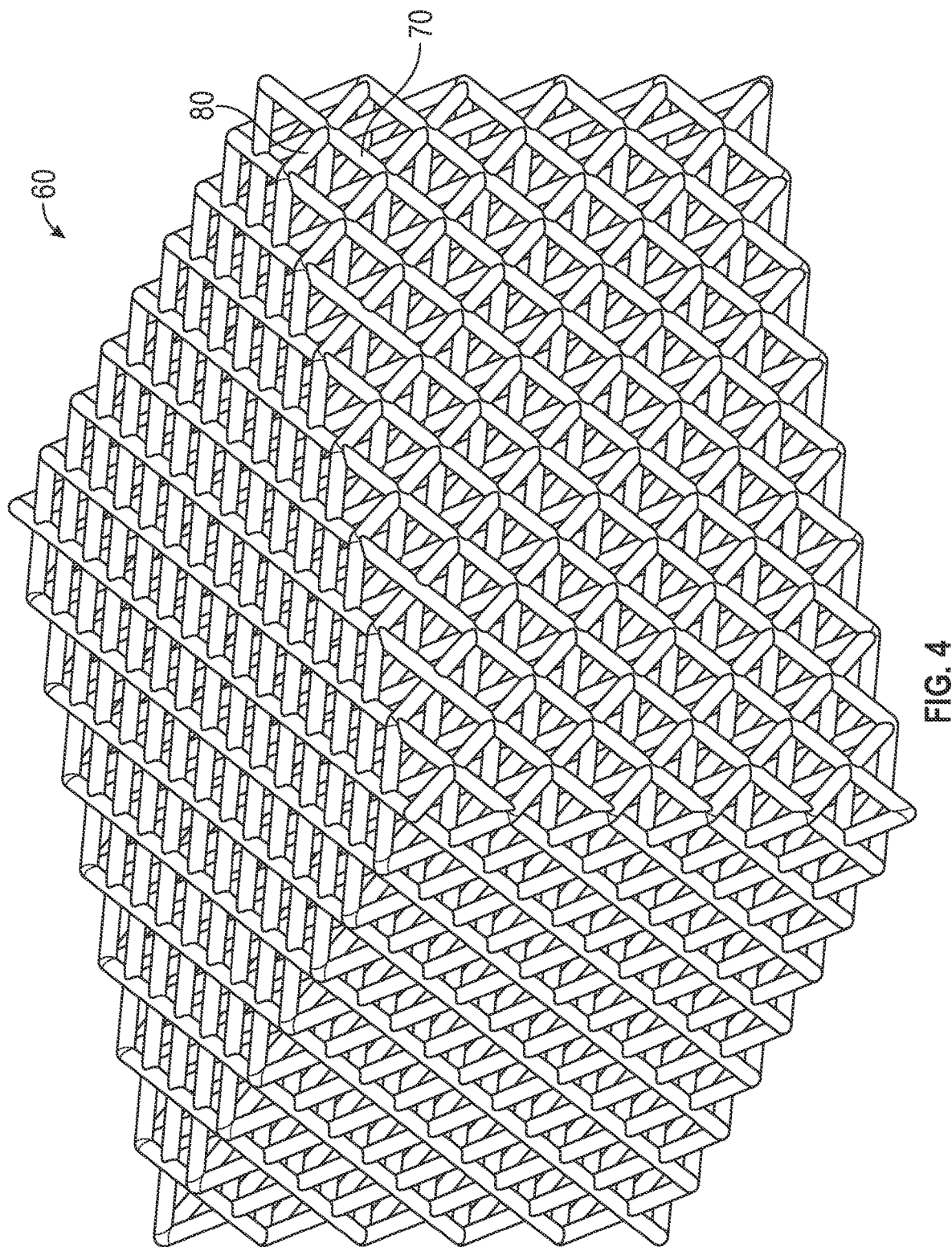
FIG. 4 is a side perspective view of the lattice pattern shown in FIG. 3.
Figure 5:
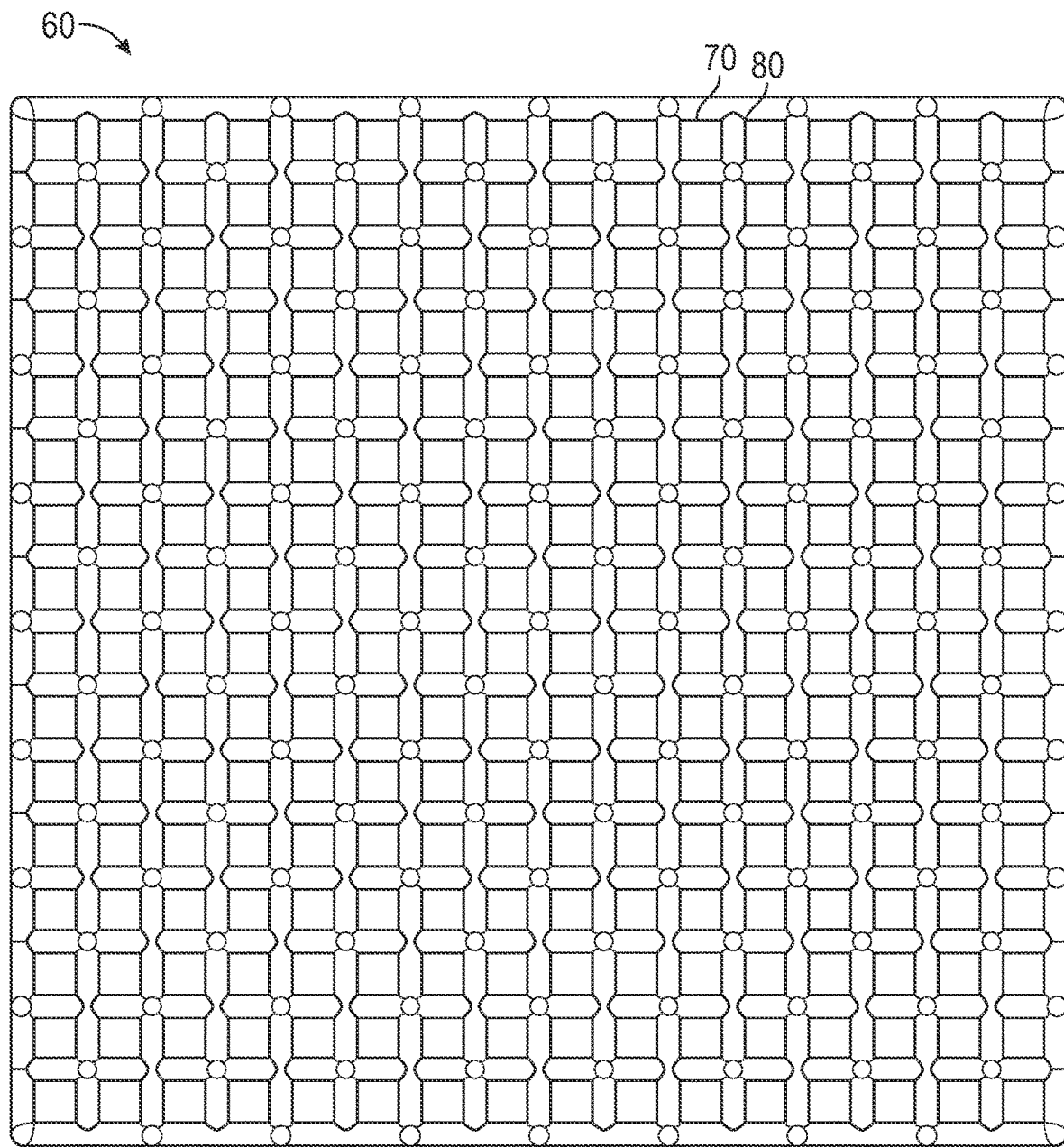
FIG. 5 is a top plan, 40° filtered from XY plane view of the lattice pattern shown in FIG. 3.
Figure 6:
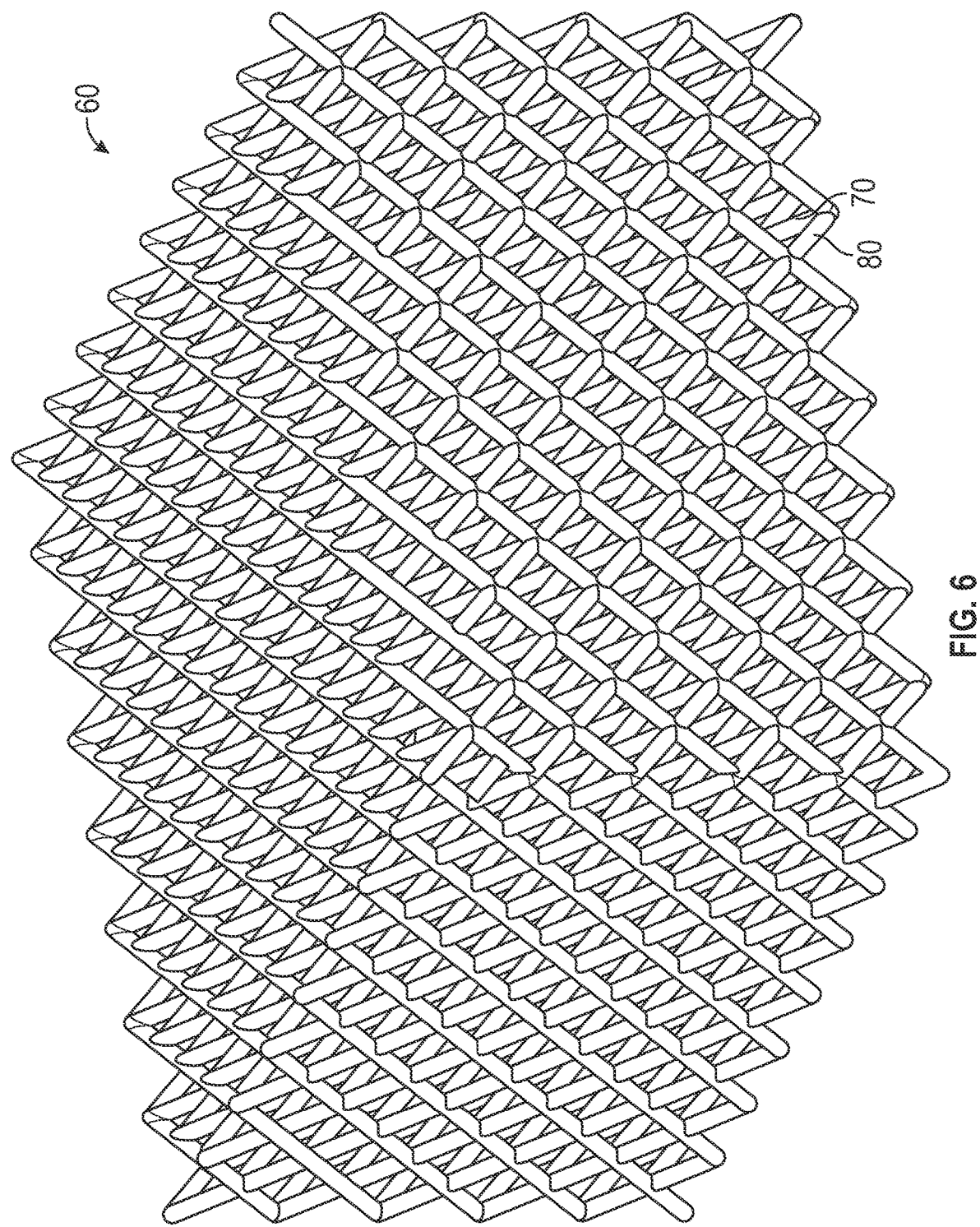
FIG. 6 is a side perspective view of the lattice pattern shown in FIG. 5.
Figure 7:
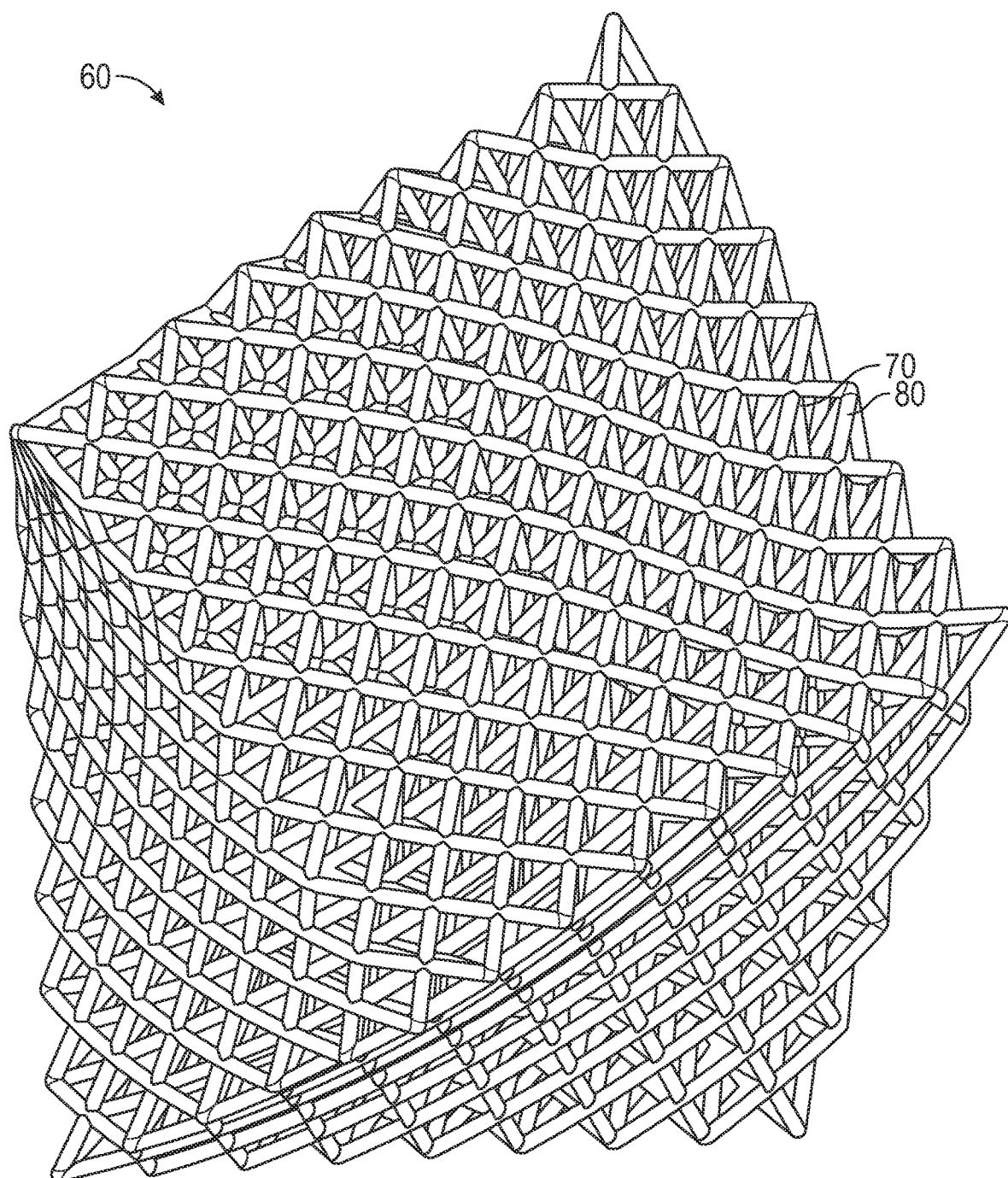
FIG. 7 is a top perspective view of a twisted lattice pattern.
Figure 8:
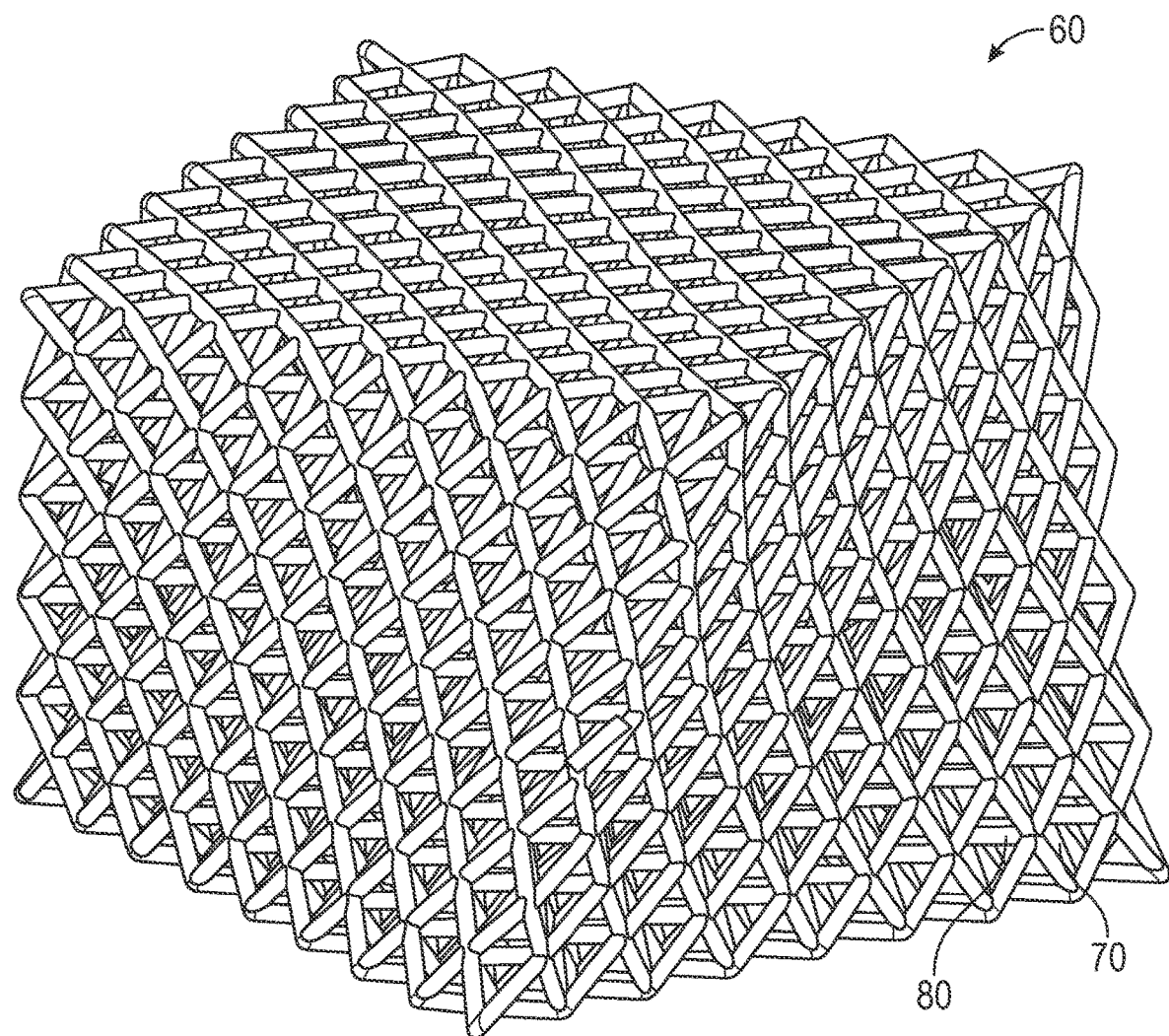
FIG. 8 is a side perspective view of the lattice pattern shown in FIG. 7.
Figure 9:
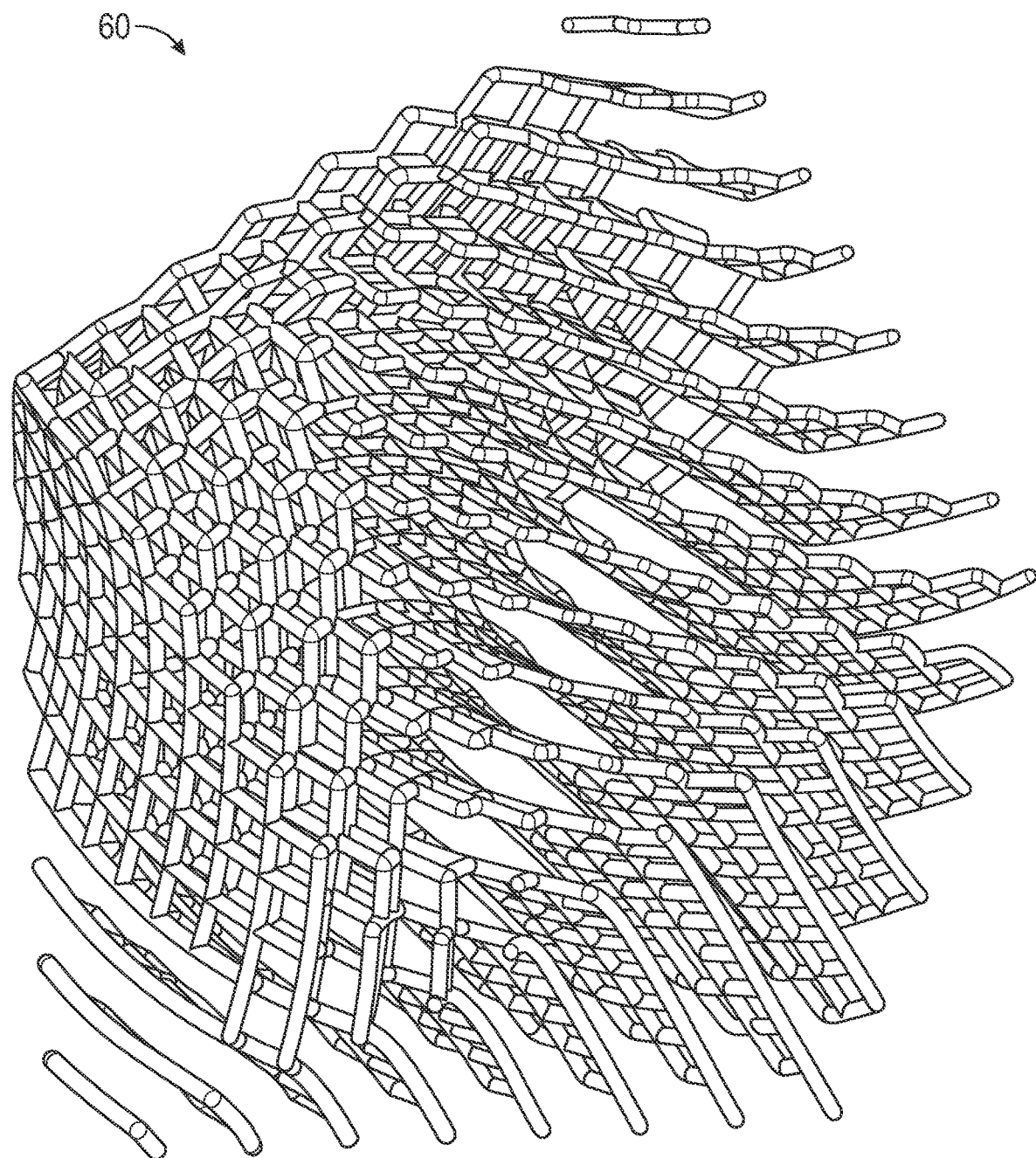
FIG. 9 is a top perspective, 40° filtered from XY plane view of the lattice pattern shown in FIG. 7.
Figure 10:
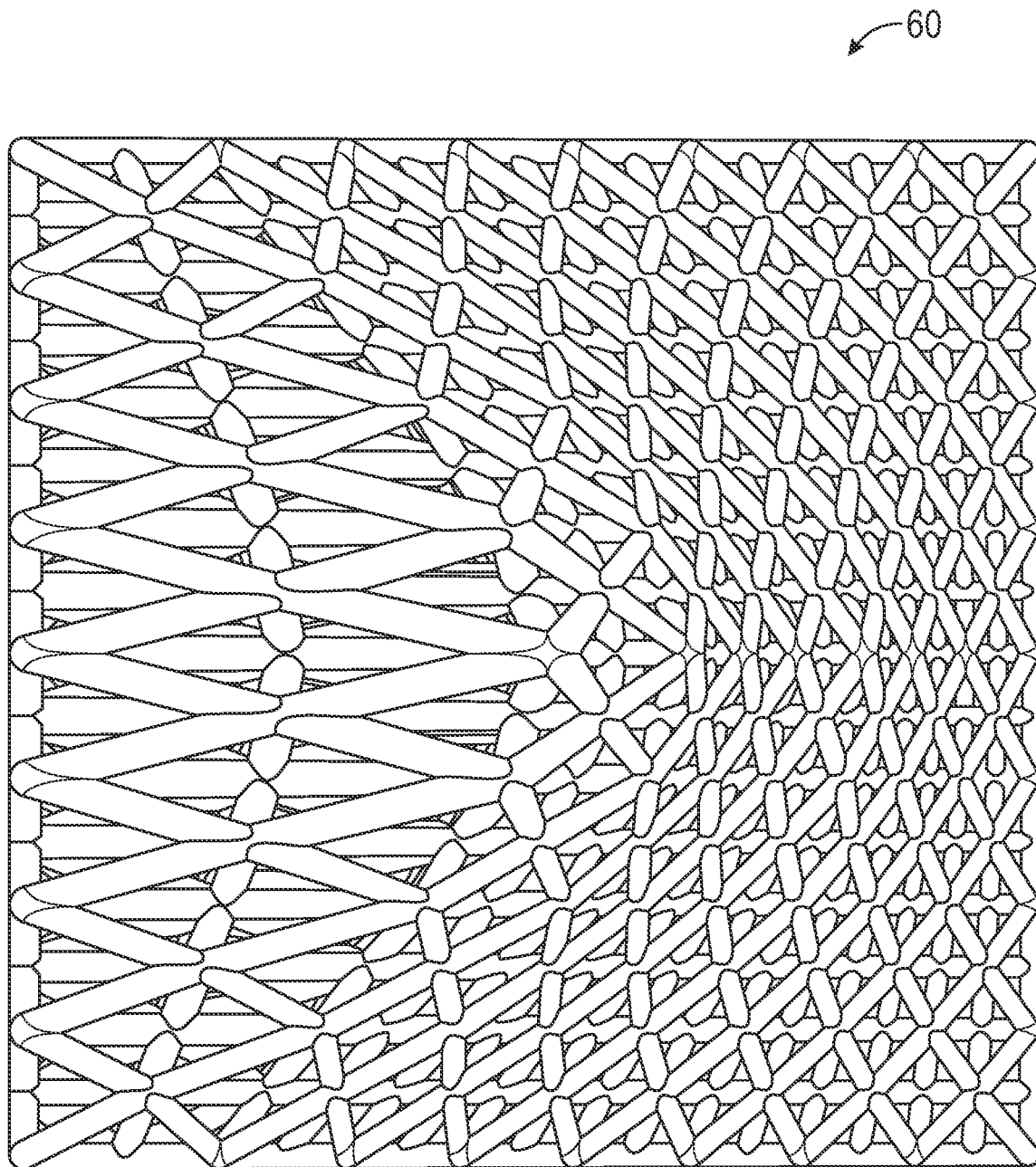
FIG. 10 is a top plan view of a variable density lattice pattern.
Figure 11:
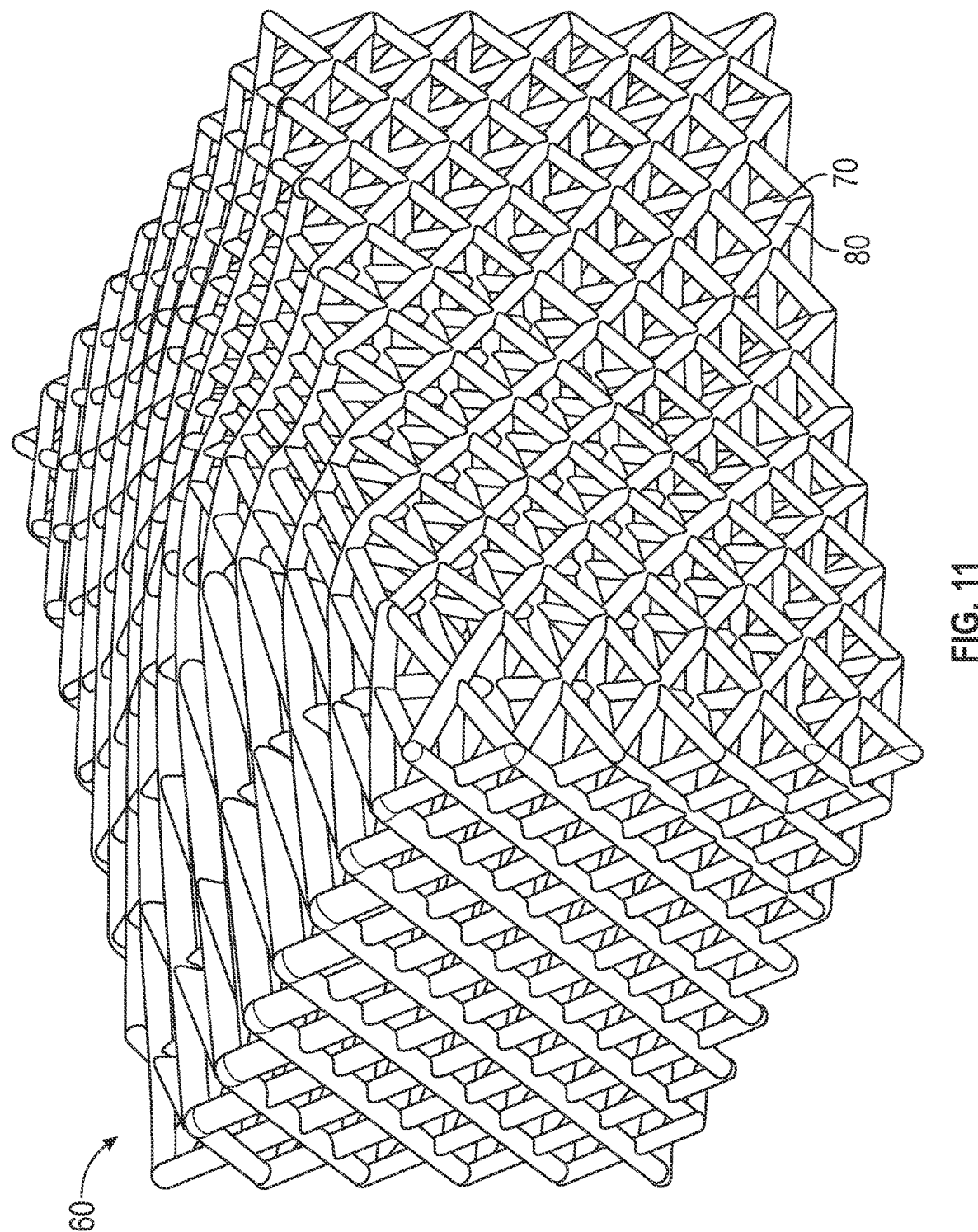
FIG. 11 is a side perspective view of the lattice pattern shown in FIG. 10.
Figure 12:
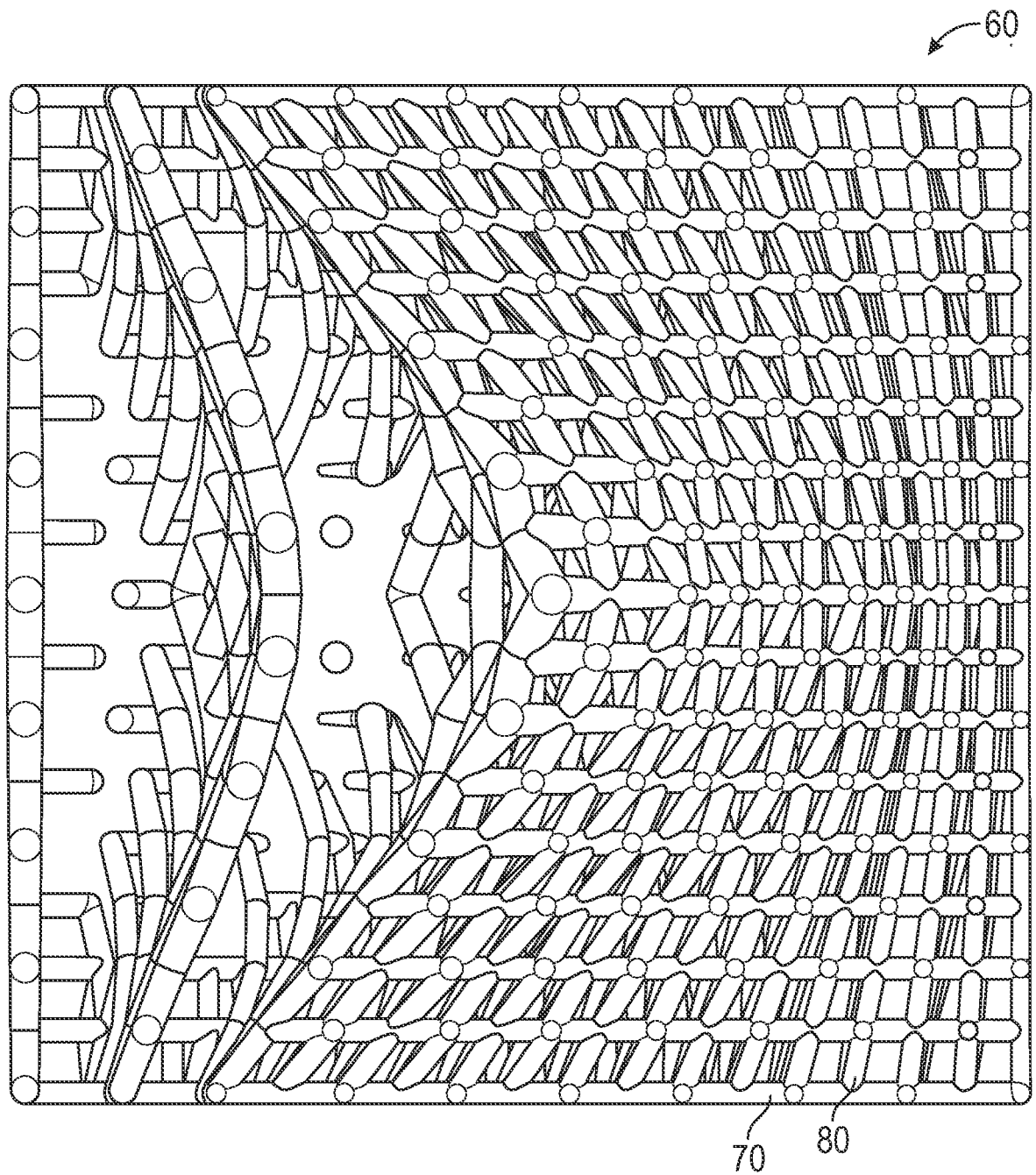
FIG. 12 is a top plan, 40° filtered from XY plane view of the lattice pattern shown in FIG. 10.
Figure 13:
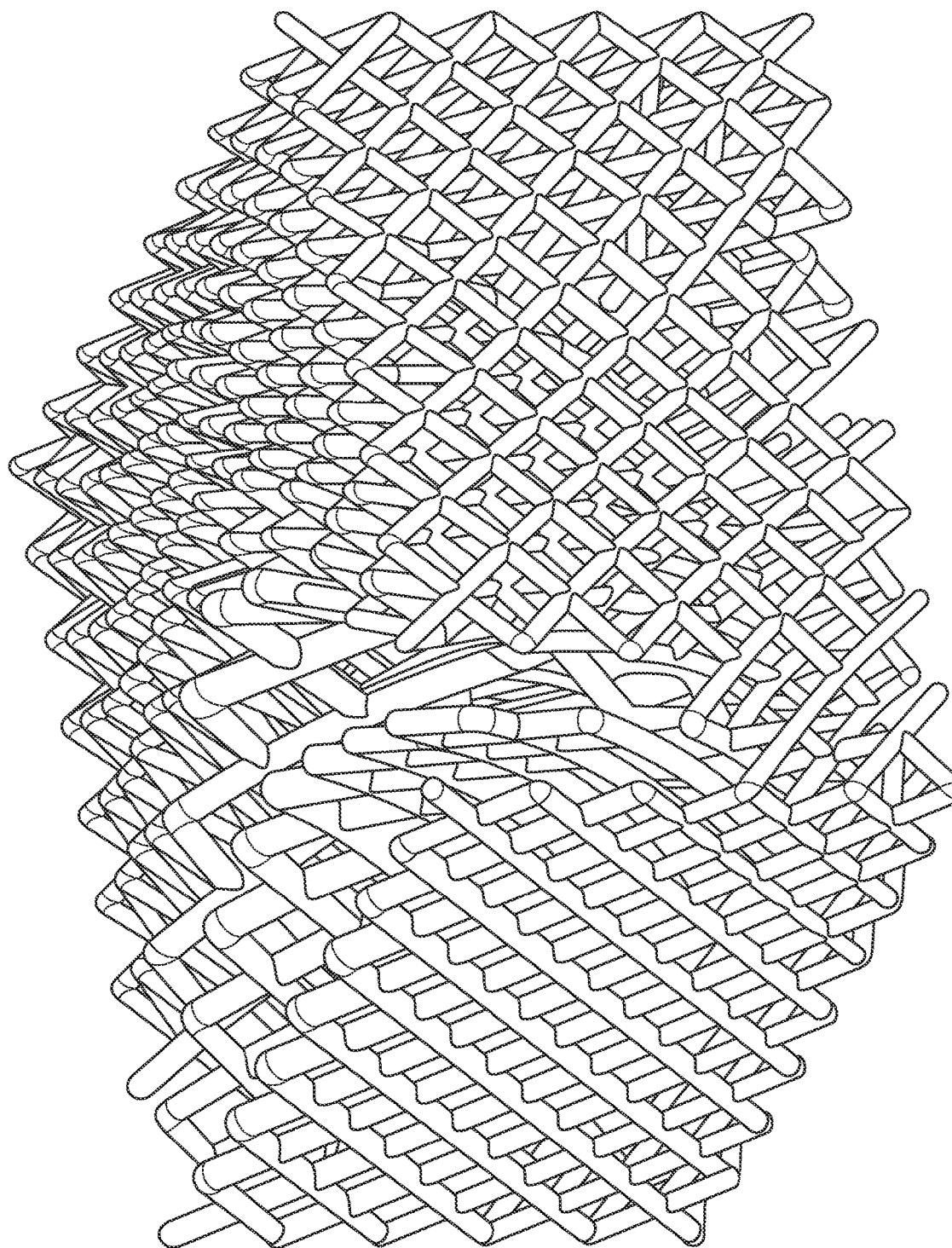
FIG. 13 is a side perspective view of the lattice pattern shown in FIG. 12.

As illustrated in FIGS. 1 and 2, the binder jet process 10 includes a first step 11 of spreading layers of powder 30 evenly across the build plate 22 of a binder jet machine 20; this step can be performed manually or with a re-coater or roller device 25. This occurs in the build box 21 portion of the binder jet machine 20, where a build plate 22 lowers as each layer of powder 30 is applied. In a second step 12, a printer head 24 deposits liquid binder 35 on the appropriate regions for each layer of powder 30, leaving unbound powder 32 within the build box 21. In a third step 13, the binder bonds adjacent powder particles together. In a fourth step 14, the first and second steps 11, 12 are repeated as many times as desired by the manufacturer to form a green (unfinished) part 40 with an intended geometry.

In an optional fifth step 15, a portion of the binder 35 is removed using a debinding process, which may be via a liquid bath or by heating the green part to melt or vaporize the binder. In a sixth step 16, the green part 40 is sintered in a furnace, where, at the elevated temperature, the metal particles repack, diffuse, and flow into voids, causing a contraction of the overall part. As this sintering step 16 continues, adjacent particles eventually fuse together, forming a final part, examples of which (reference characters 140, 250, 350, and 400) are shown in FIGS. 24-40. This process causes 10-25% shrinkage of the part from the green state 40 to its final form 50, and the final part has a void content that is less than 10% throughout. In some embodiments, the debinding and sintering steps 15, 16 may be conducted in the same furnace. In an optional step 17, before the binder jet process 10 begins, optimization software can be used to design a high performance club head or component in CAD. This step allows the manufacturer to use individual player measurements, club head delivery data, and impact location in combination with historical player data and machine learning, artificial intelligence, stochastic analysis, and/or gradient based optimization methods to create a superior club component or head design.

Though binder jetting is a powder-based process for additive manufacturing, it differs in key respects from other directed energy powder based systems like DMLS, DMLM, and EBAM. The binder jet process 10 provides key efficiency and cost saving improvements over DMLM, DMLS, and EBAM that makes it uniquely suitable for use in golf club component manufacturing. For example, binder jetting is more energy efficient because it is not performed at extremely elevated temperatures and is a much less time consuming process, with speeds up to one hundred times faster than DMLS. The secondary debinding step 15 and sintering step 16 are batch processes which help keep overall cycle times low, and green parts 40 can be stacked in a binder jet machine 20 in three dimensions because the powder is generally self-supporting during the build process, obviating the requirement for supports or direct connections to a build plate. Therefore, because there is no need to remove beams, members, or ligaments because of length, aspect ratio, or overhang angle requirements, lattice structures can take any form and have a much wider range of geometries than are possible when provided by prior art printing methods.

The binder jet process 10 also allows for printing with different powdered materials, including metals and non-metals like plastic. It works with standard metal powders common in the metal injection molding (MIM) industry, which has well-established and readily available powder supply chains in place, so the metal powder used in the binder jet process 10 is generally much less expensive than the powders used in the DMLS, DMLM, and EBAM directed energy modalities. The improved design freedom, lower cost and faster throughput of binder jet makes it suitable for individually customized club heads, prototypes, and larger scale mass-produced designs for the general public.

Lattice Structures

The binder jet process described above allows for the creation of lattice structures, including those with beams that would otherwise violate the standard overhang angle limitation set by DMLM, DMLS, and EBAM. It can also be used to create triply periodic minimal surfaces (TPMS) and non-periodic or non-ordered collections of beams.

Compressing or otherwise reducing the size of cells in a section of the lattice increases the effective density and stiffness in those regions. Conversely, expanding the size of the cells is an effective way to intentionally design in a reduction of effective density and stiffness. Effective density is defined as the density of a unit of volume in which a fully dense material may be combined with geometrically designed-in voids, which can be filled with air or another material, and/or with another or other fully dense materials. The unit volume can be defined using a geometrically functional space, such as the lattice cell shown in FIGS. 22-23 or a three dimensional shape fitted to a typical section, and in particular the volume of a sphere with a diameter that is three to five times the equivalent diameter of the nearest beam or collection of beams. The binder jet process allows for the creation of a structure with a uniform final material density of at least 90%, meaning that the porosity of the beams and surfaces that make up the lattice structure is relatively low, resulting in the average mass density of the structure is at least 90% of the expected density of the structure if it were to have zero porosity. This contrasts with previous uses of DMLM, DMLS, and EBAM to change the actual material density by purposely creating unstructured porosity in parts.

Figure 22:
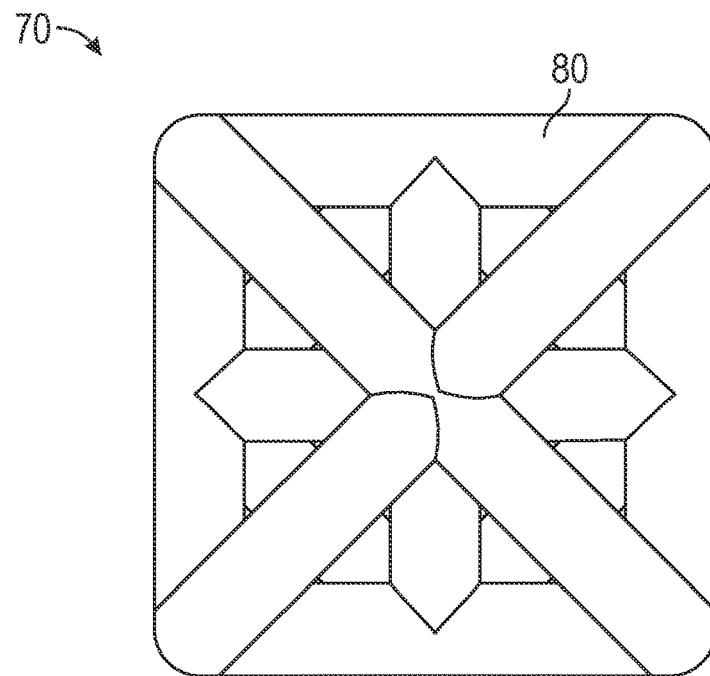
FIG. 22 is a top plan view of a unit cell of a lattice.
Figure 23:
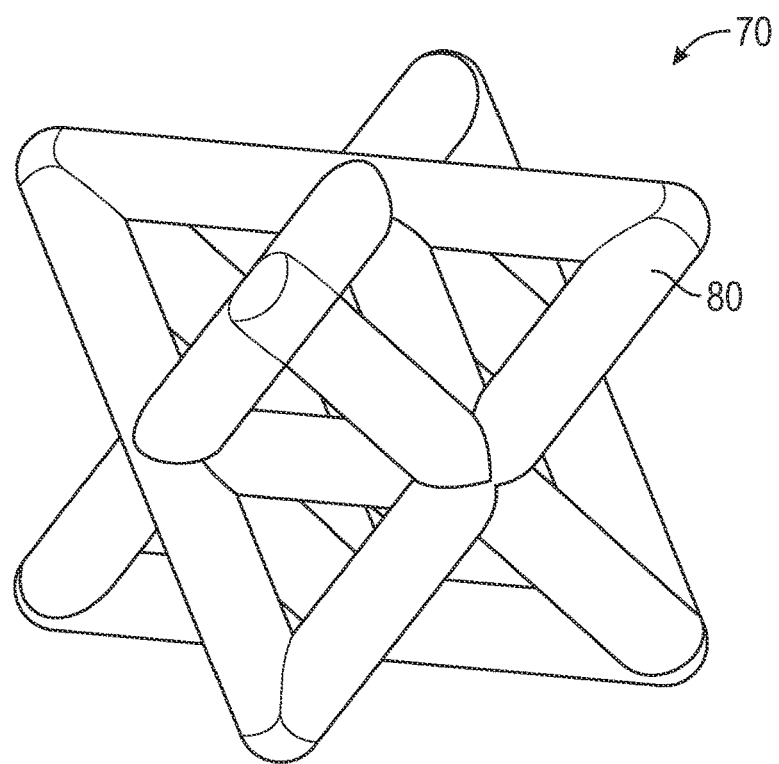
FIG. 23 is a side perspective view of the unit cell shown in FIG. 22.

Examples of lattice structures 60 that can be created using the process 10 described above are shown in FIGS. 3-21, and include warped, twisted, distorted, curved, and stretched lattices that can optimize the structure for any given application. Individual lattice cells 70 are shown in FIGS. 22-23, and may be used in addition to or instead of more complex lattice structures 60. FIGS. 5, 6, 9-10, 12, 16, 20 and 21 illustrate what the more complicated structures look like when a 40 degree overhang limitation is applied: a significant portion of the structure is lost. Another benefit of not having an overhang angle limitation is that manufacturers can create less ordered or non-ordered collections of beams. The lattice structures 60 shown herein may have repeating cells 70 or cells with gradual and/or continuously changing size, aspect ratio, skew, and beam diameter. The change rate between adjacent cells 70 and beams 80 may be 10%, 25%, 50%, and up to 100%, and this change pattern may apply to all or only some of the volume occupied by the lattice structure.

Figure 14:
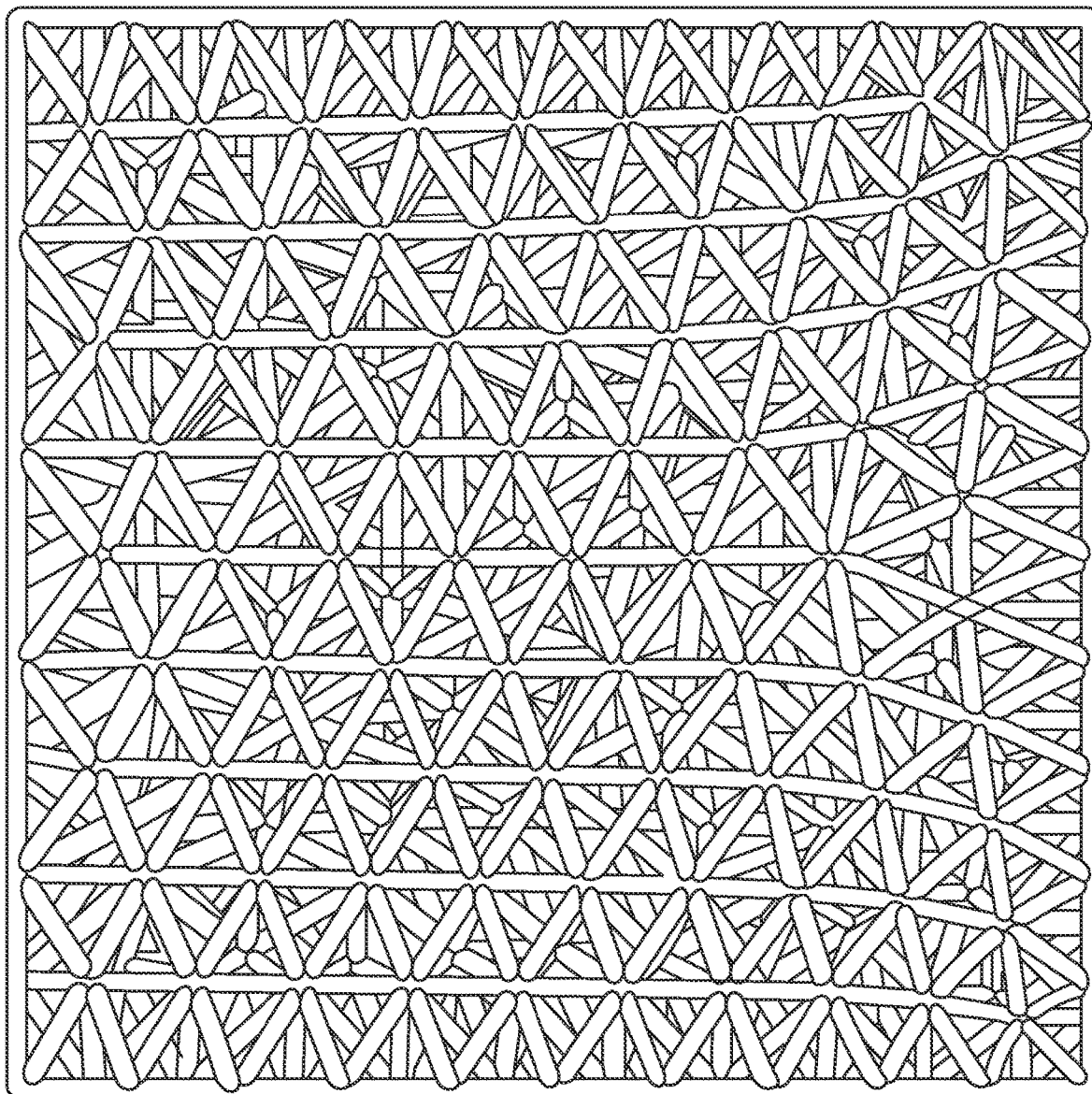
FIG. 14 is a top plan view of a non-ordered collection of beams and tetrahedral cell lattice pattern.
Figure 15:
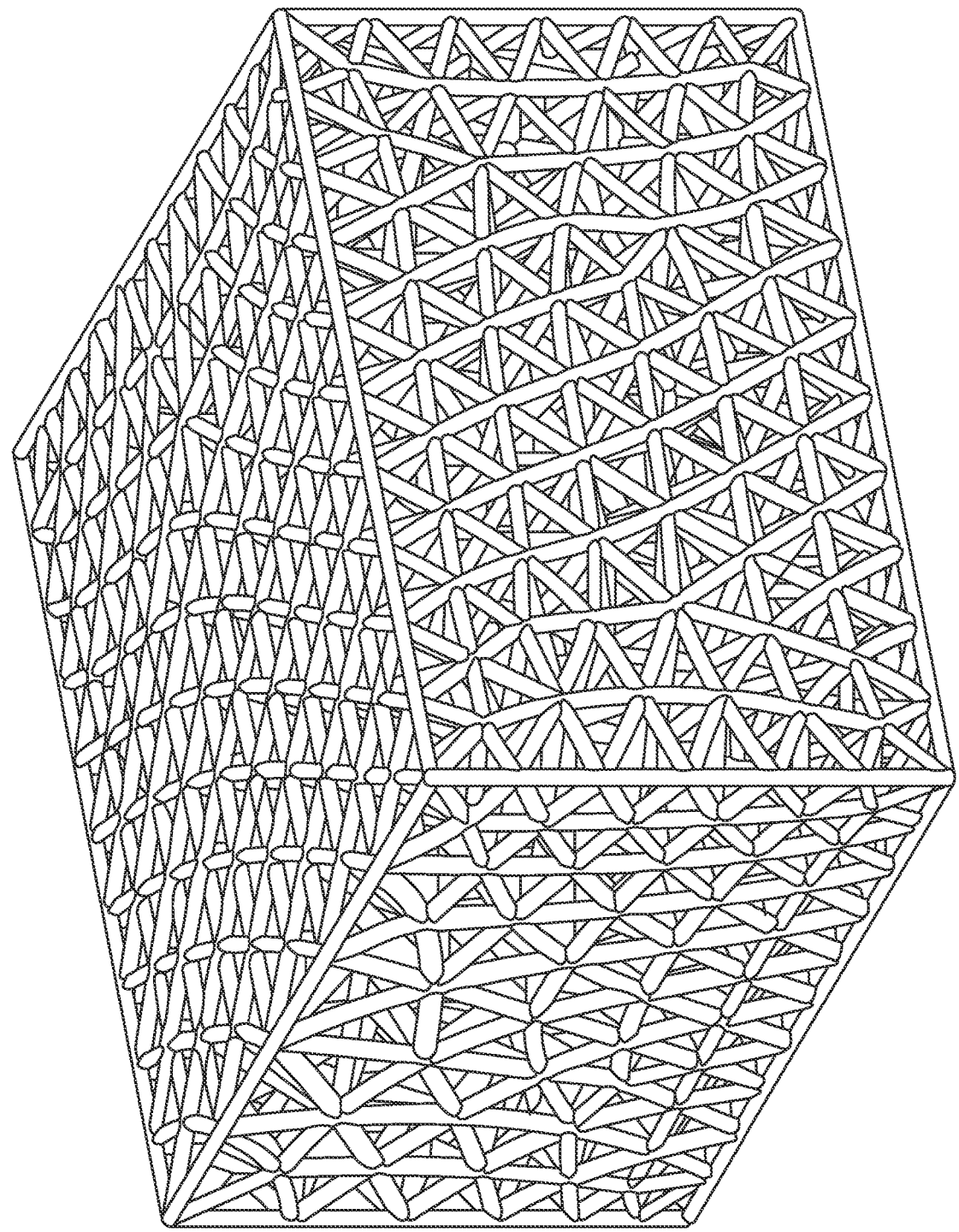
FIG. 15 is a side perspective view of the lattice pattern shown in FIG. 14.
Figure 16:
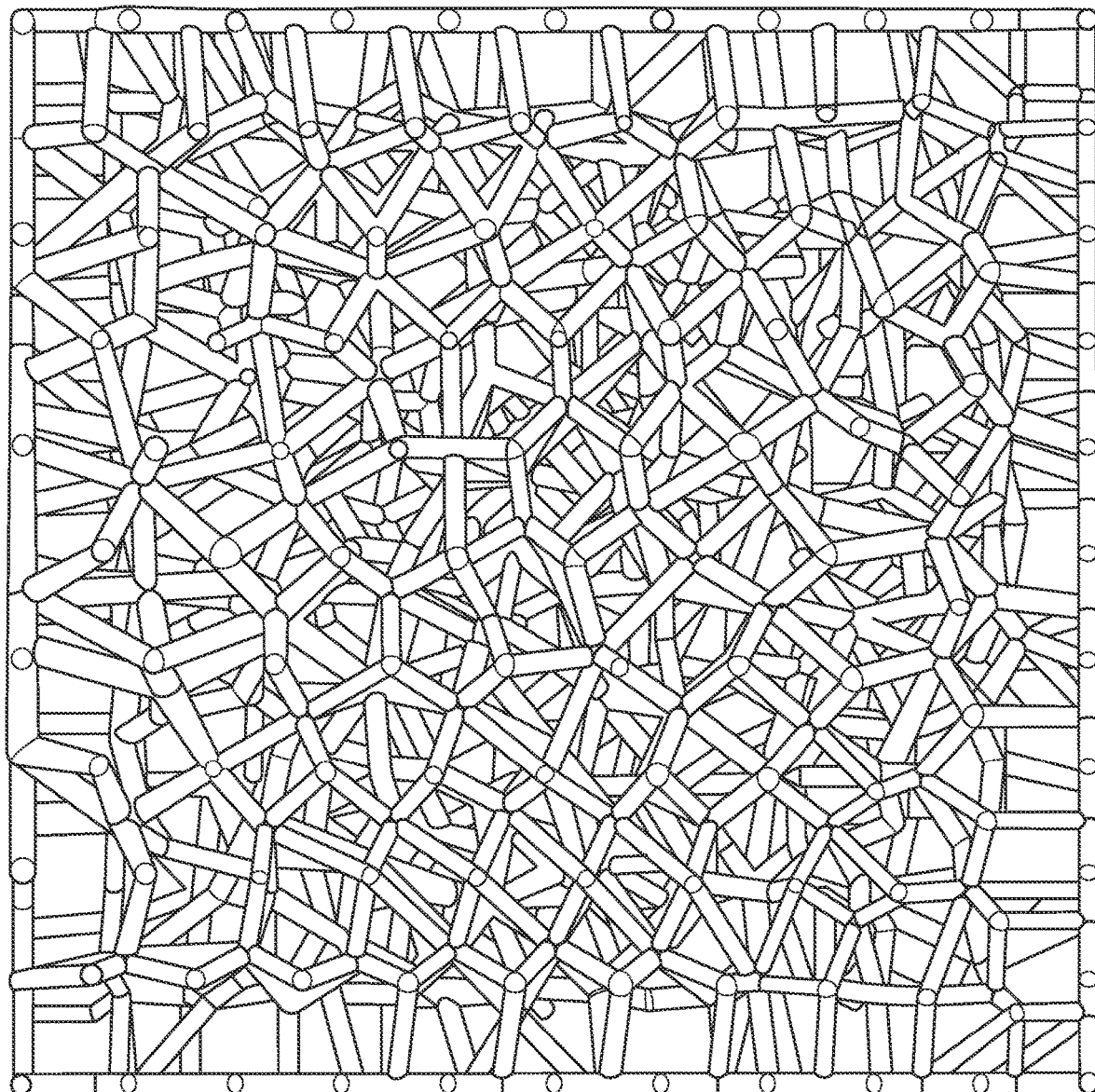
FIG. 16 is a top plan, 40° filtered from XY plane view of the lattice pattern shown in FIG. 14.
Figure 17:
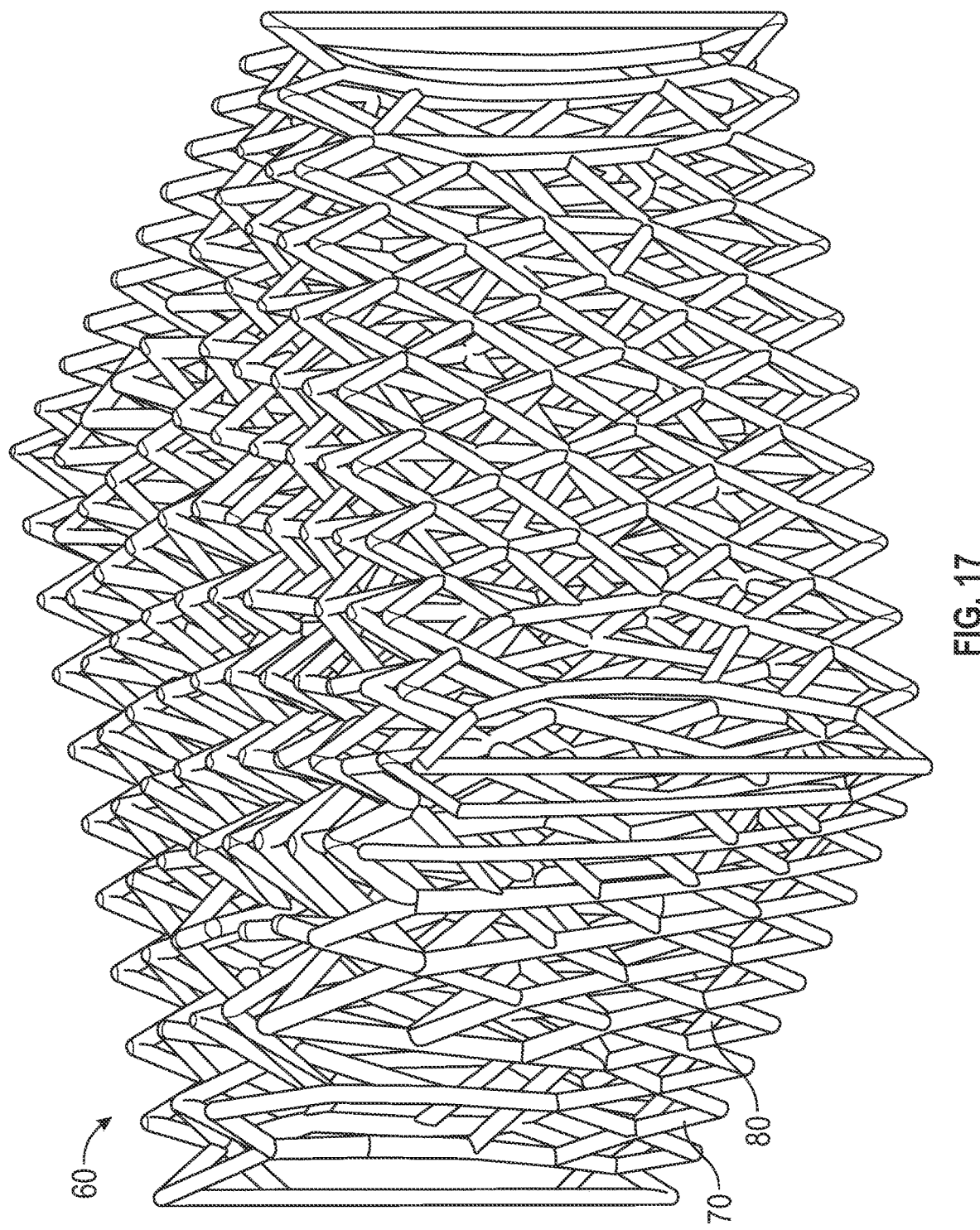
FIG. 17 is a side perspective view of the lattice pattern shown in FIG. 16.
Figure 18:
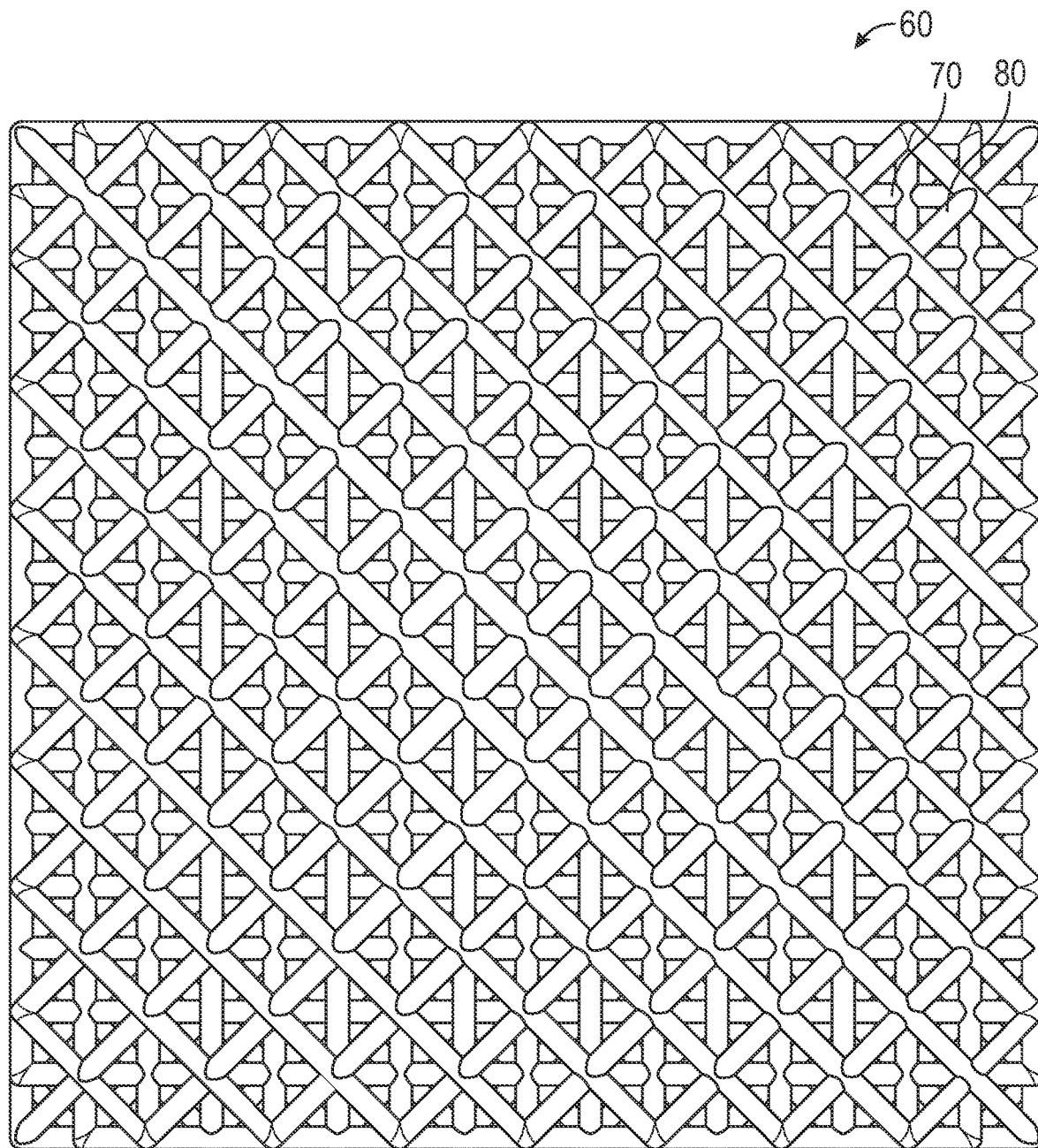
FIG. 18 is top plan view of a conformal, spherical top lattice pattern.
Figure 19:
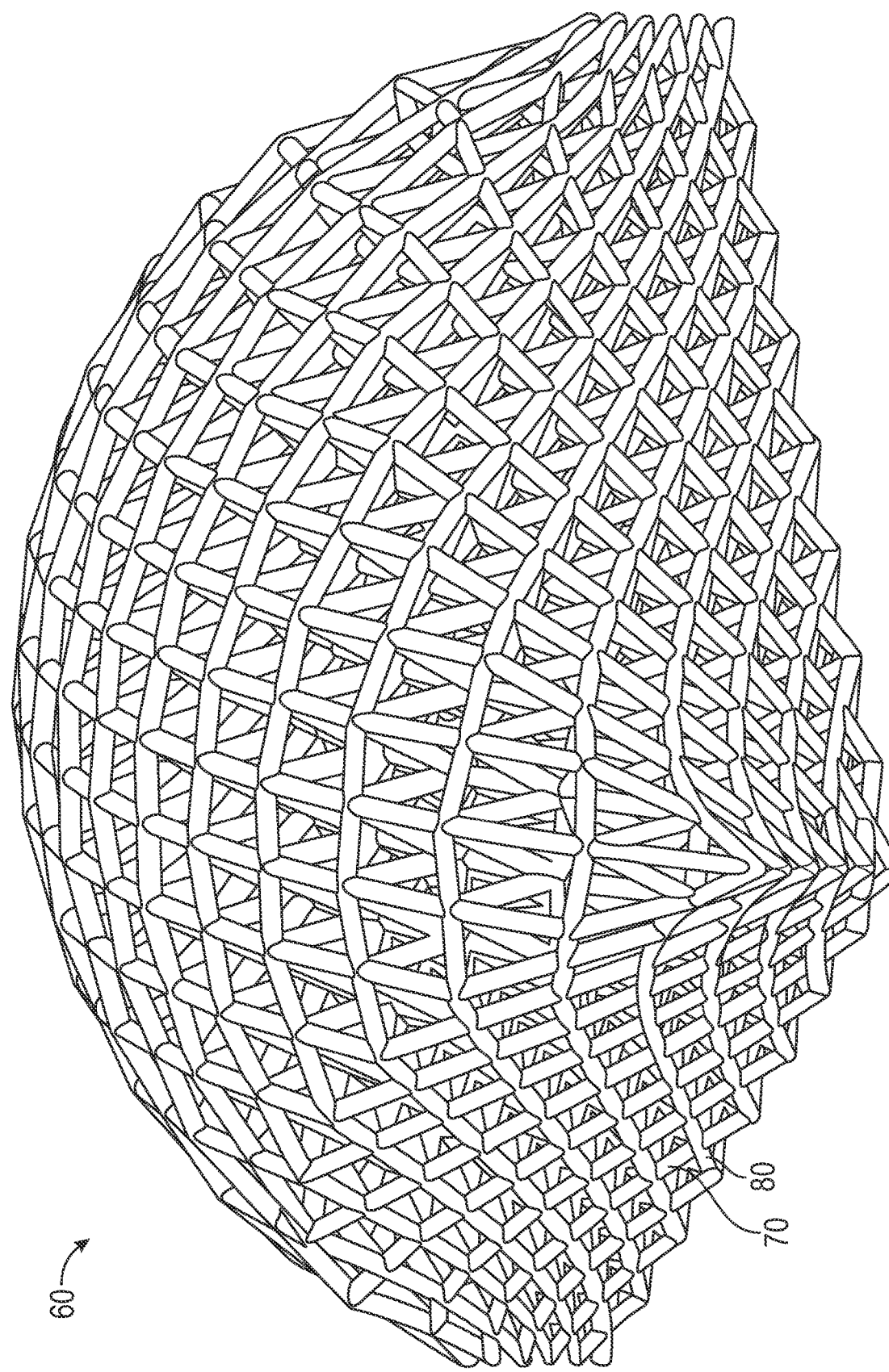
FIG. 19 is a side perspective view of the lattice pattern shown in FIG. 18.
Figure 20:
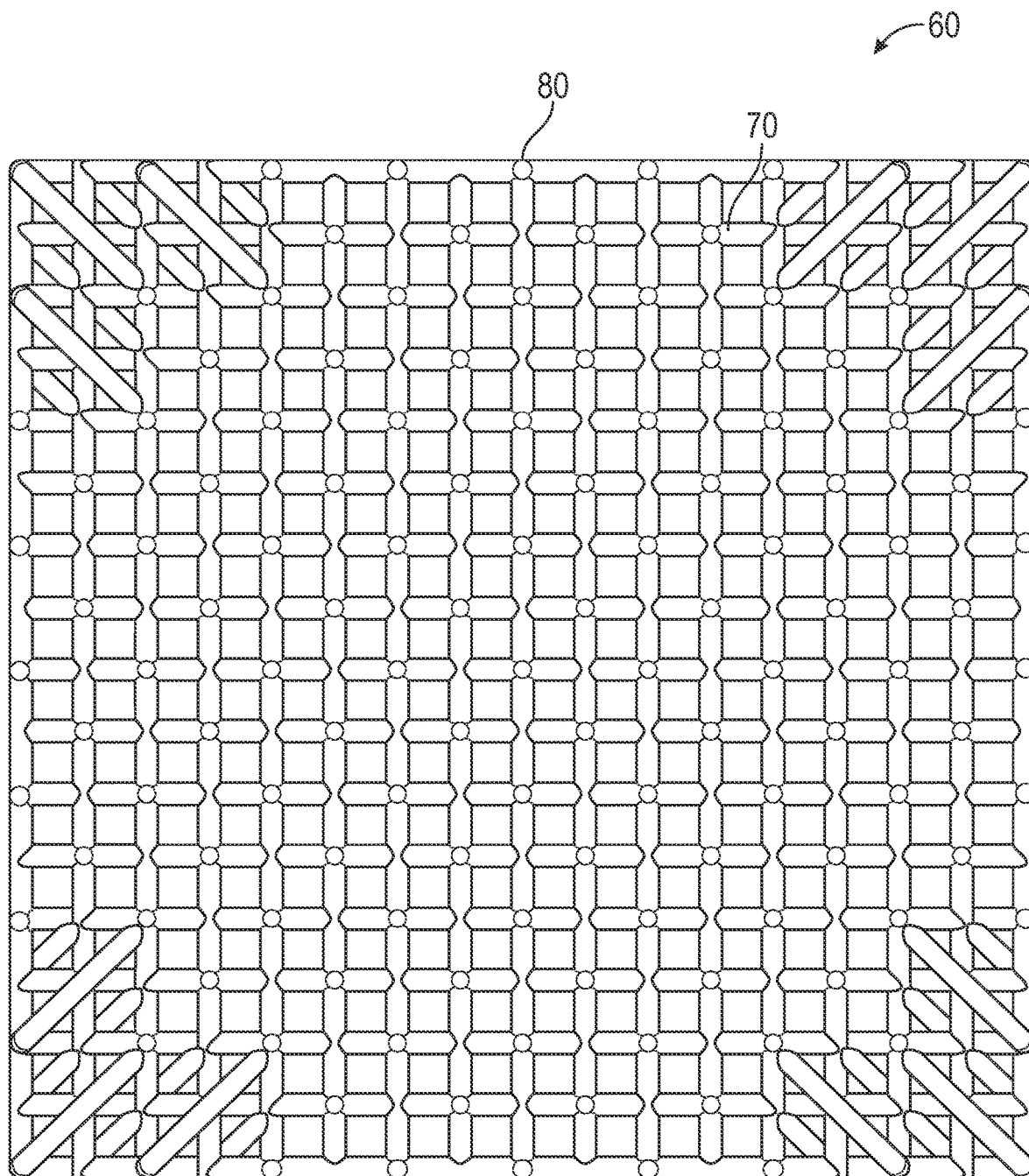
FIG. 20 is a top plan, 40° filtered from XY plane view of the lattice pattern shown in FIG. 18.
Figure 21:
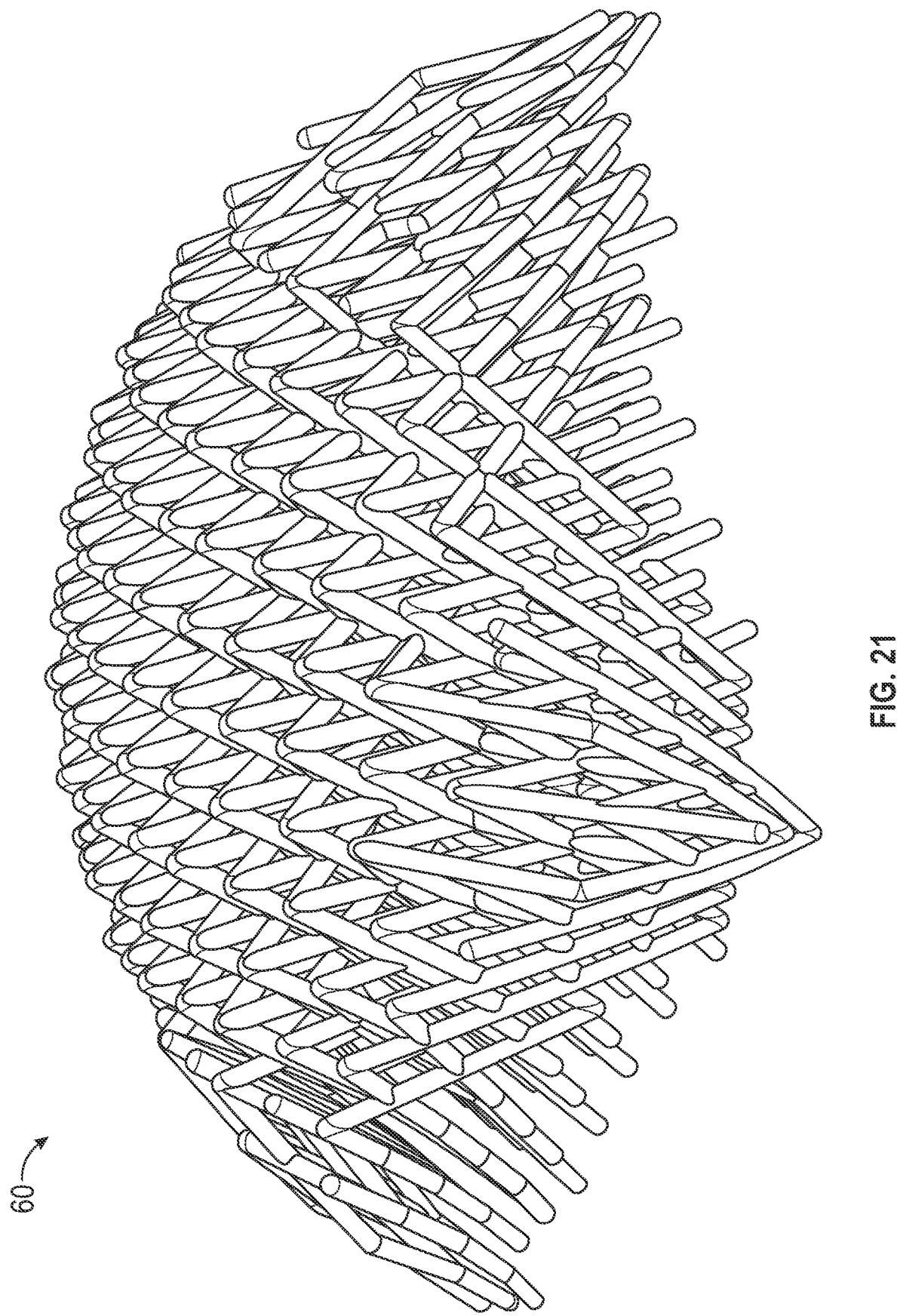
FIG. 21 is a side perspective view of the lattice pattern shown in FIG. 20.

Cell 70 type can change abruptly if different regions of a component need different effective material properties, but size, aspect ratio, skew, beam diameter can then change continuously as distance from the cell type boundary increases. The diameter of the beams 80 may be constant or tapered, and while their cross sections are typically circular, they can also be elliptical like the structural members disclosed in U.S. Pat. No. 10,835,789, the disclosure of which is hereby incorporated by reference in its entirety herein. Such structures may take the form of a series of connected tetrahedral cells 70, as shown in FIGS. 14-15. The lack of an overhang constraint allows for the beams 80 to be oriented in any fashion and therefor allows for the generation of a conformal lattice of virtually any size and shape. Modern meshing software also provide quick and simple method by which to fill volumes and vary the lattice density via non-ordered tetrahedral cells. Tetrahedral cells 70 are also very useful for varying cell size and shape throughout a part. Cell 70 types may also include simple cubic, body centered cubic, face centered cubic, diamond, fluorite, octet, truncated cube, truncated octahedron, kelvin cell, isotruss, and Weaire-Phelan.

Lattice Applications in Golf Club Heads

Figure 28:
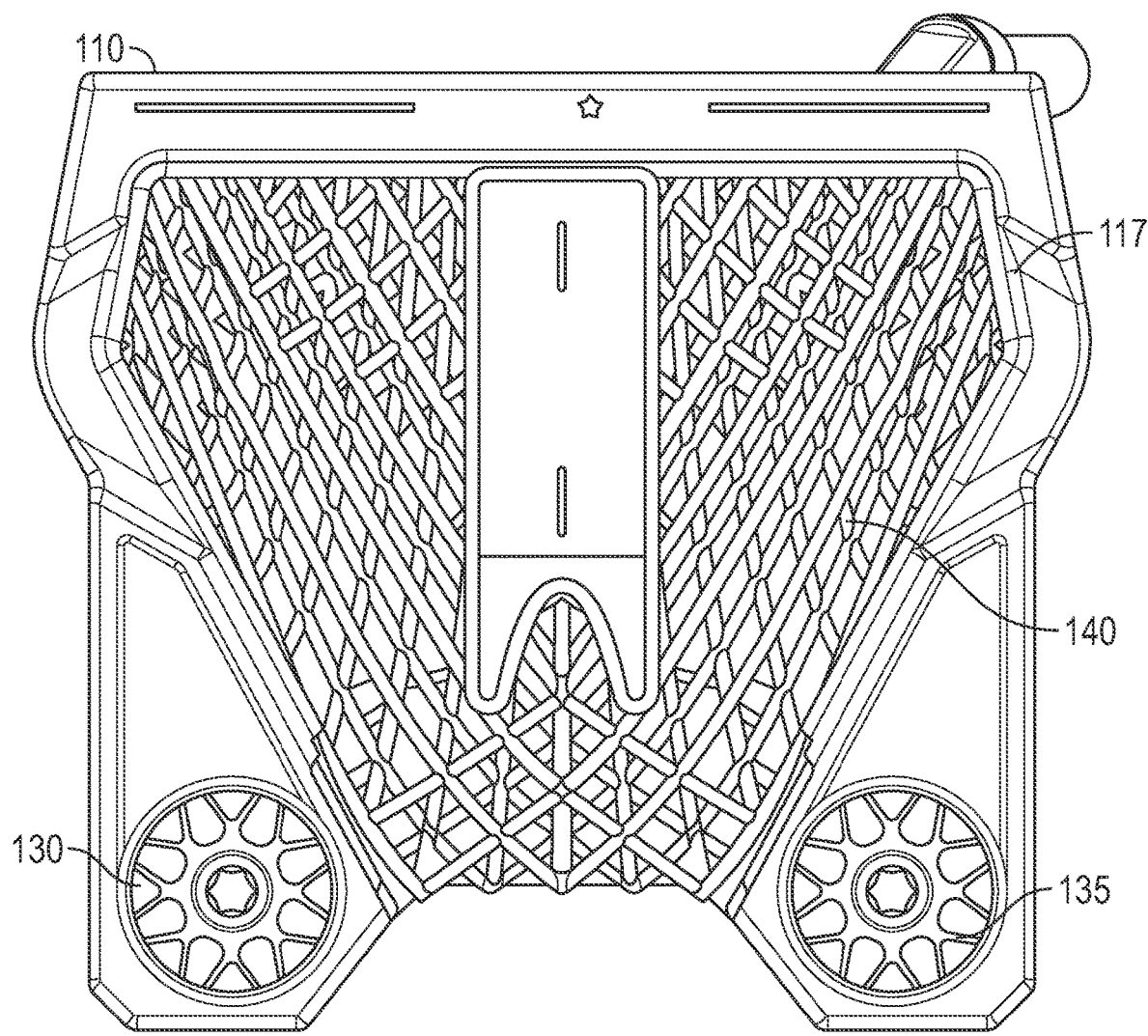
FIG. 28 is a sole plan view of another embodiment of a putter head with a sole puck formed from a lattice.
Figure 29:
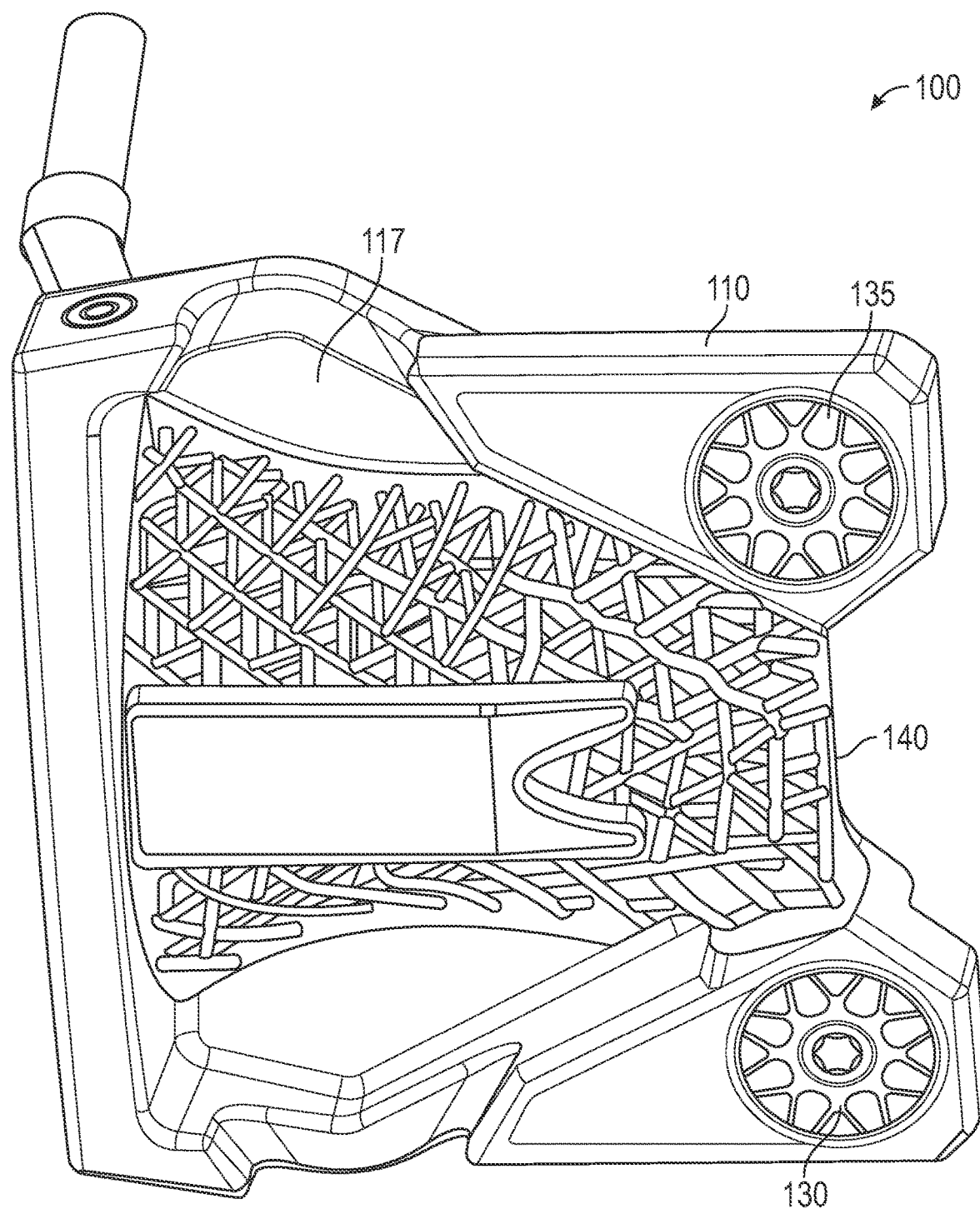
FIG. 29 is a sole perspective view of another embodiment of a putter head with a sole puck formed from a lattice.
Figure 30:
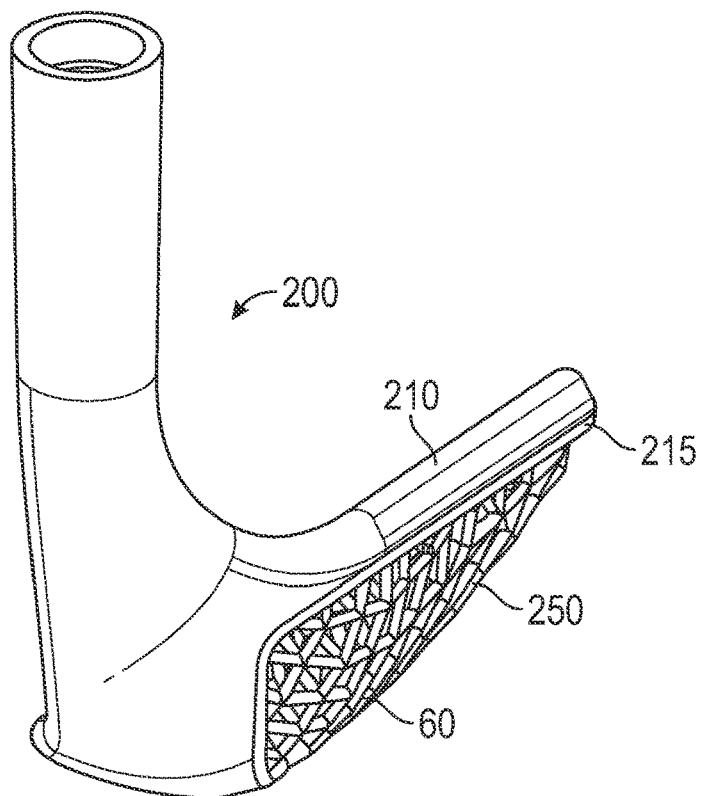
FIG. 30 is a side perspective view of an iron head with a rear insert formed from a lattice.
Figure 31:
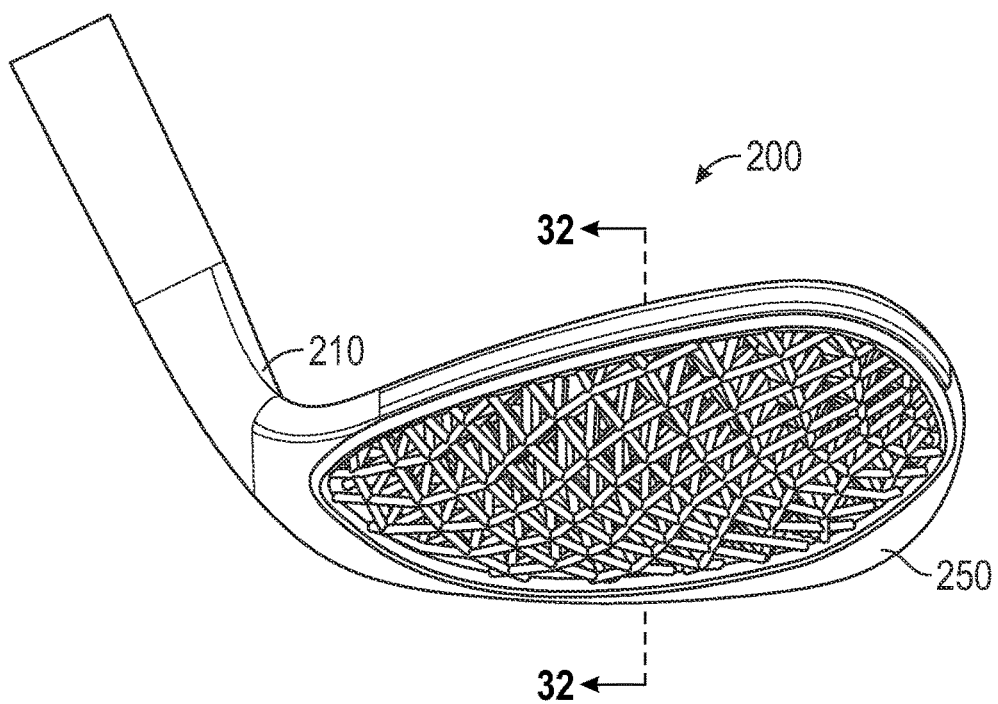
FIG. 31 is a rear perspective view of the iron head shown in FIG. 30.
Figure 32:
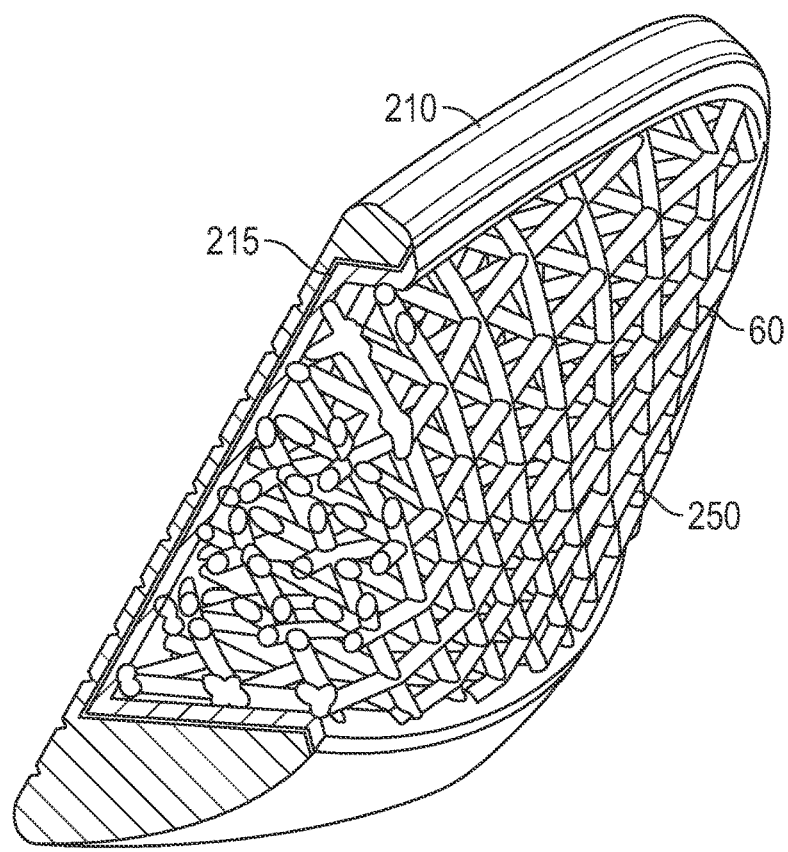
FIG. 32 is a cross-sectional view of the iron head shown in FIG. 31 taken along lines 32-32.
Figure 33:
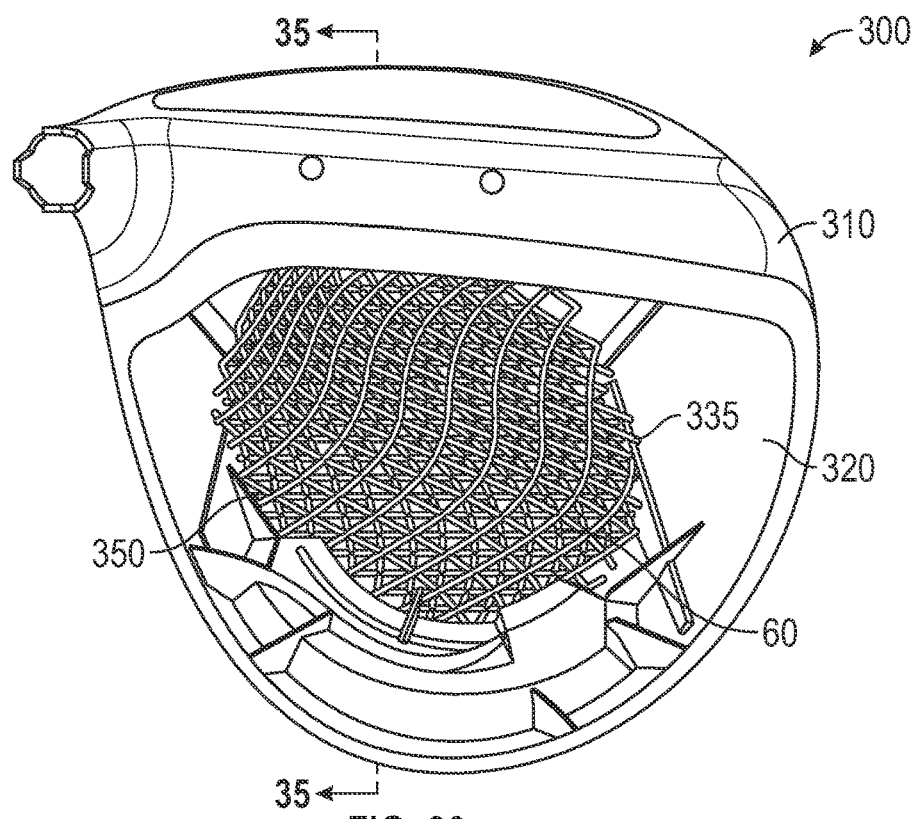
FIG. 33 is a top elevational view of a driver head with a lattice insert.
Figure 34:
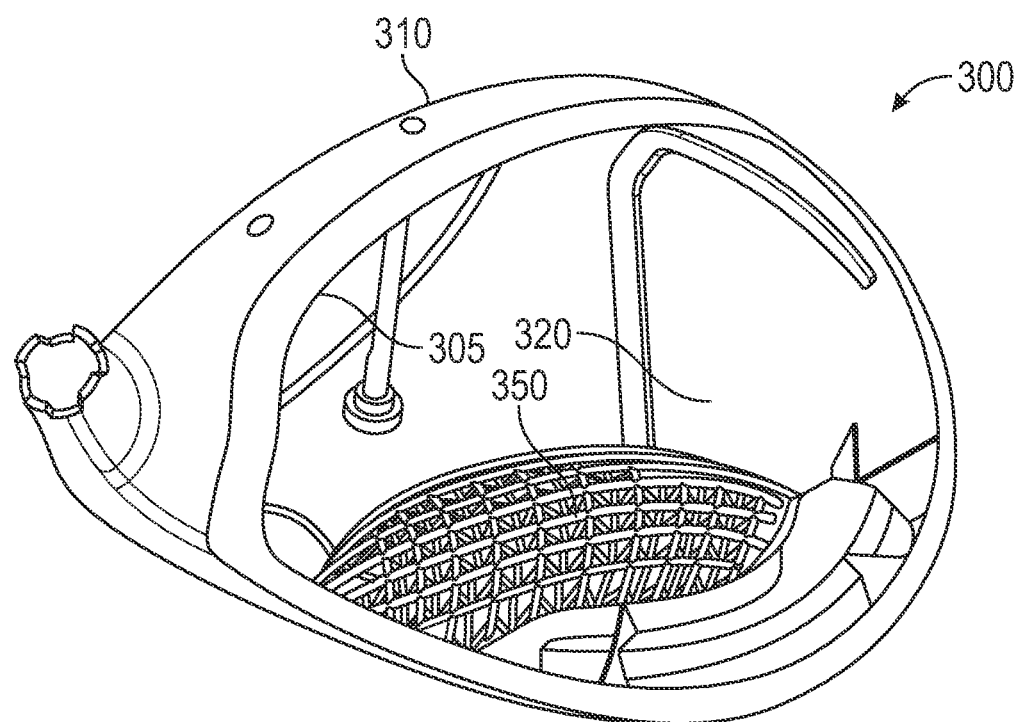
FIG. 34 is a side perspective view of the driver head shown in FIG. 33.
Figure 35:
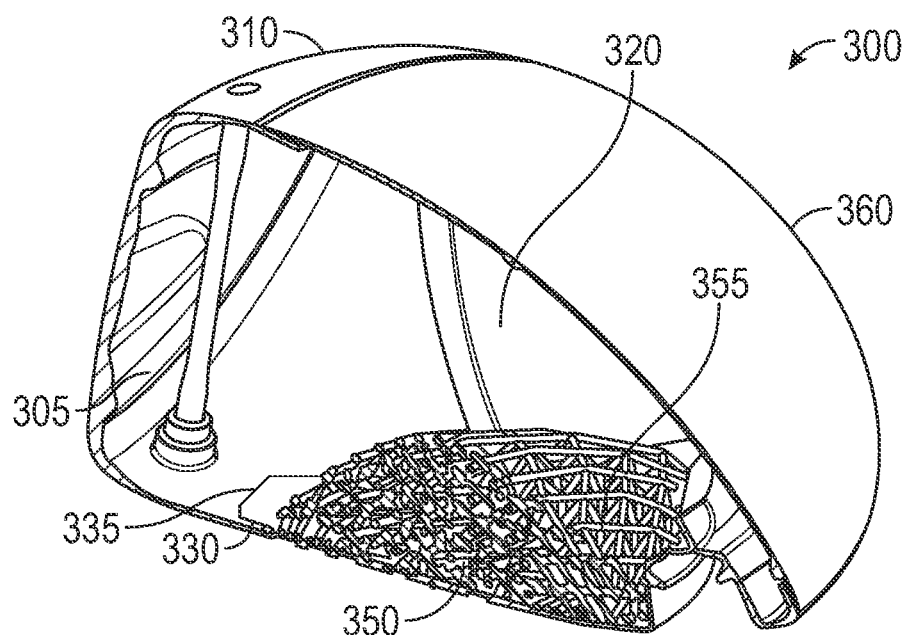
FIG. 35 is a cross-sectional view of the driver head shown in FIG. 33 taken along lines 35-35.
Figure 37:
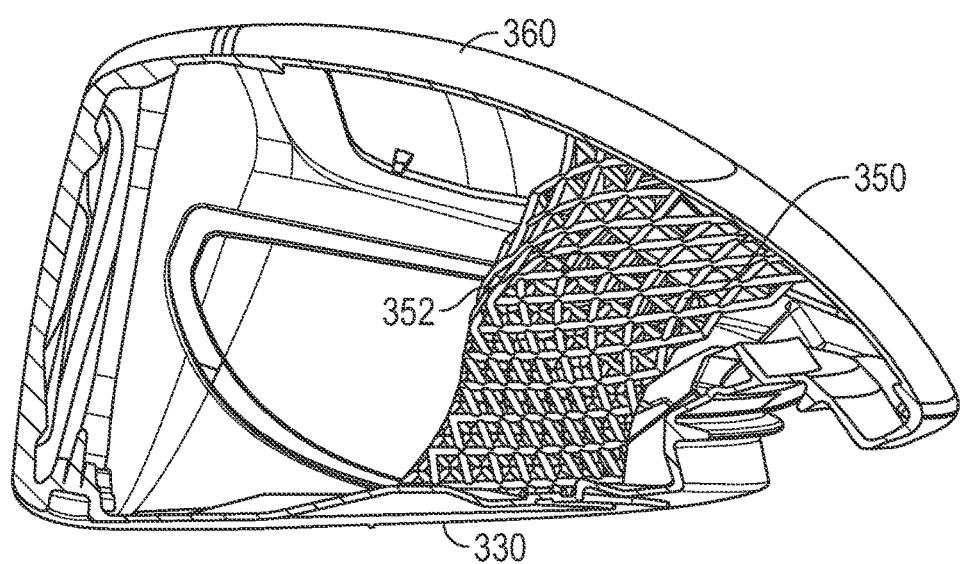
FIG. 37 is a side plan view of the embodiment shown in FIG. 36.
Figure 38:
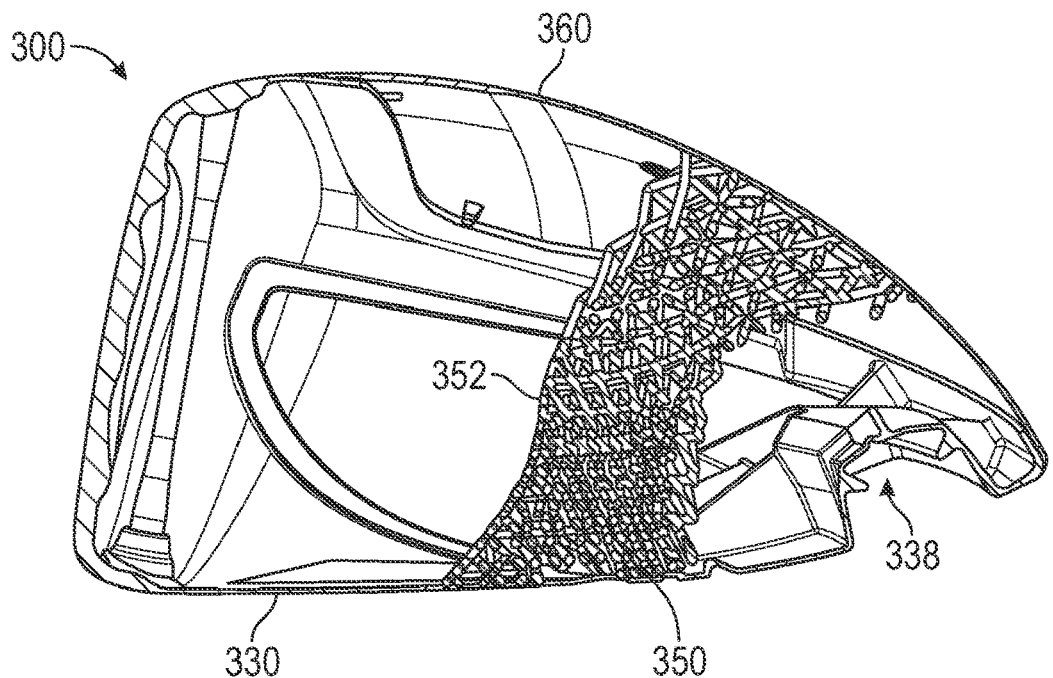
FIG. 38 is a cross-sectional view of the embodiment shown in FIG. 36 taken along lines 38-38.
Figure 39:
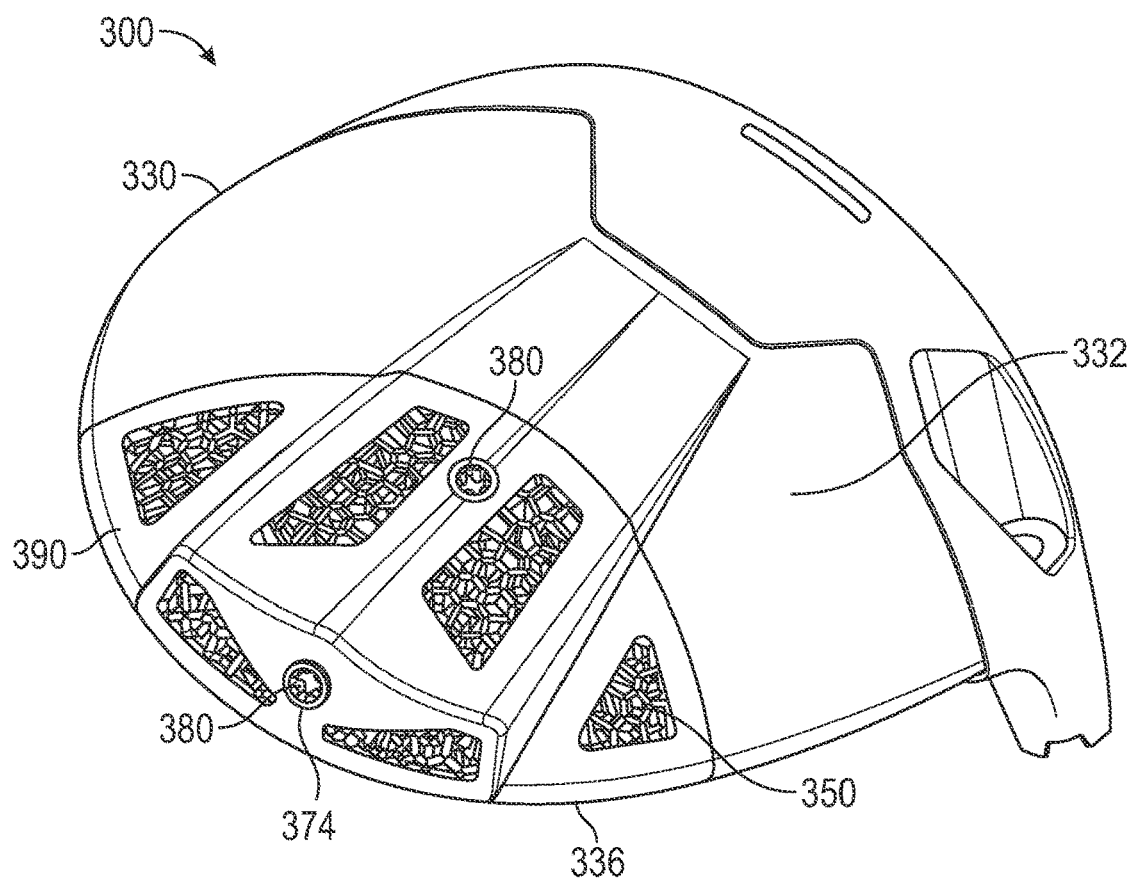
FIG. 39 is a sole perspective view of another embodiment of a driver head with a different lattice insert.
Figure 40:
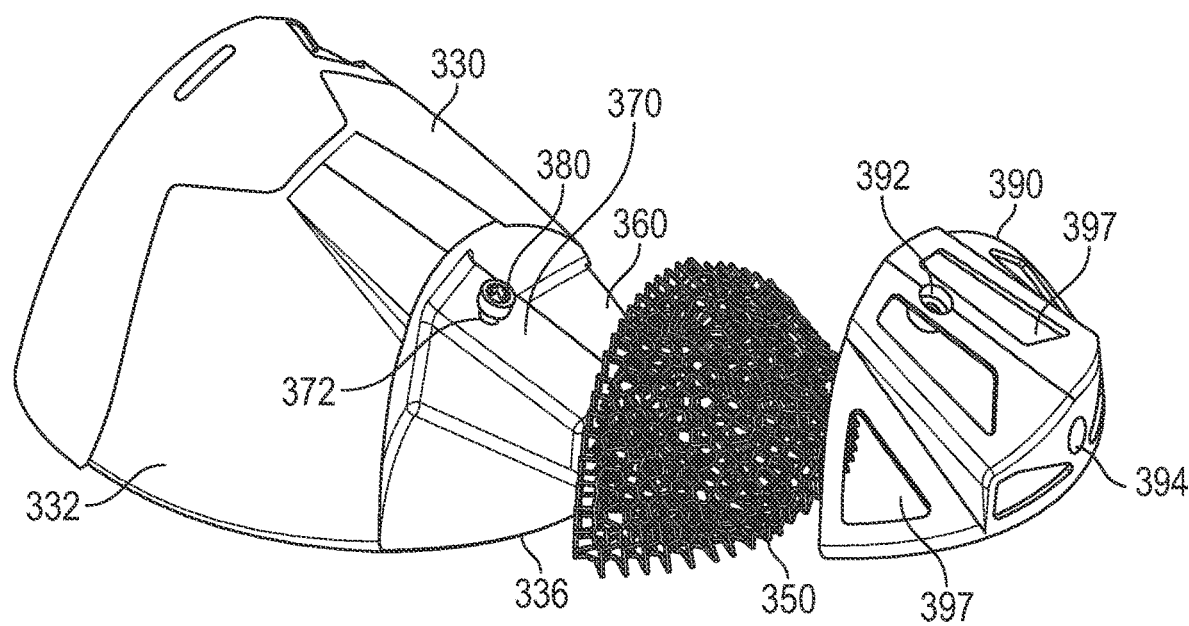
FIG. 40 is an exploded view of the embodiment shown in FIG. 39.
Figure 41:
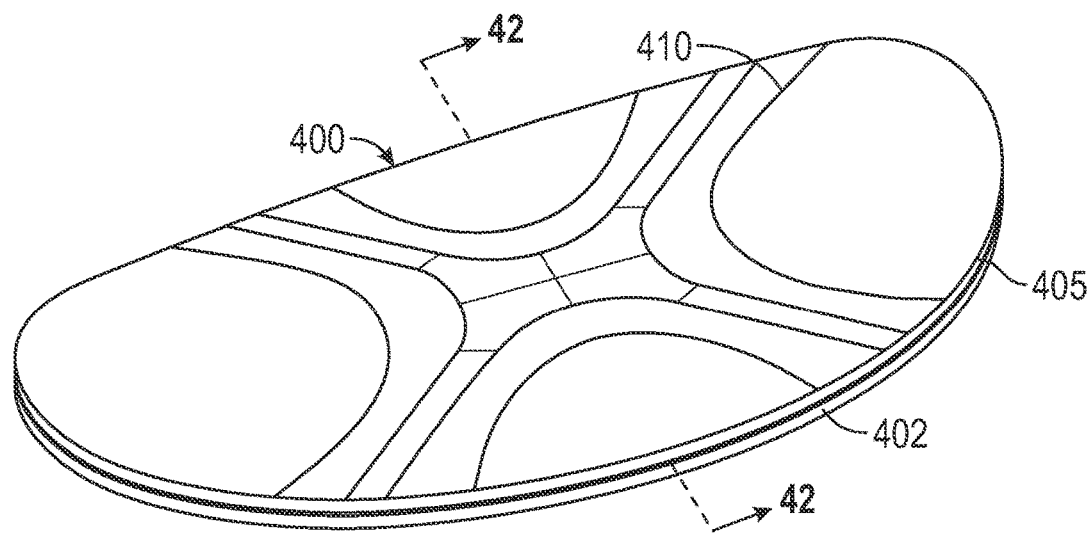
FIG. 41 is a rear perspective view of a face insert comprising a lattice.
Figure 42:
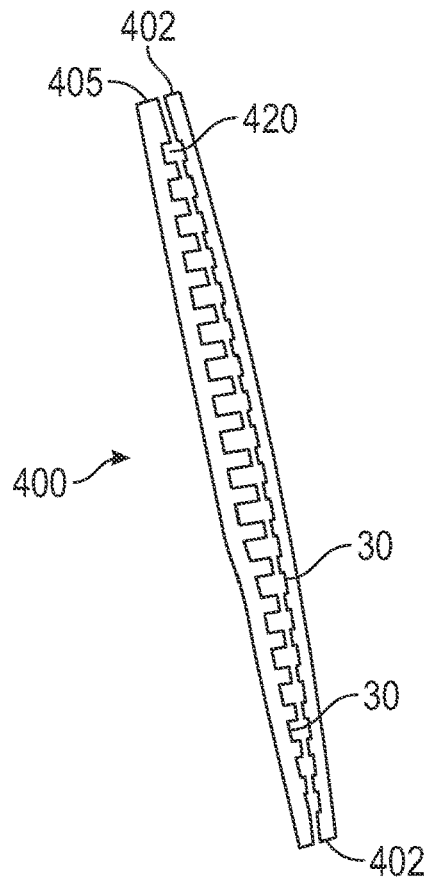
FIG. 42 is a cross-sectional view of the face insert shown in FIG. 41 taken along lines 42-42.
Figure 43:
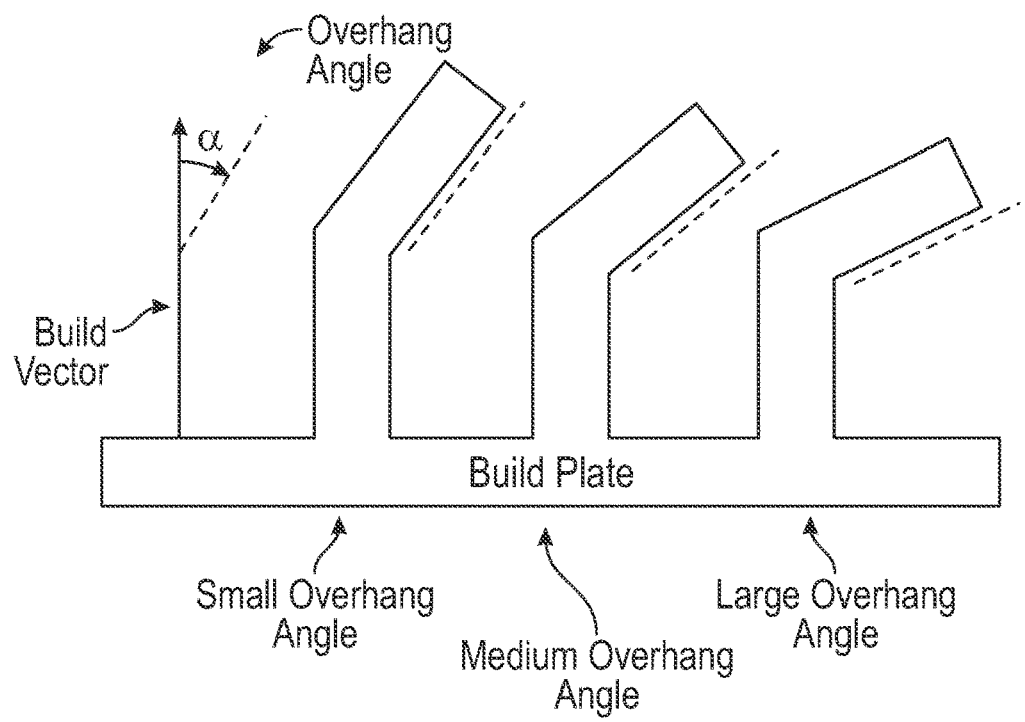
FIG. 43 is a drawing of a build plate with beams having different overhang angles.

The binder jet process 10 permits manufacturers to take full advantage of generative design and topology optimization results, examples of which are shown in the context of putter heads 100 in FIGS. 24-29, an iron-type golf club head 200 in FIGS. 30-32, driver-type golf club heads 300 in FIGS. 33-40, and a face insert 400 with a variable thickness pattern 410 in FIGS. 39 and 40. The lattice structures 60 disclosed herein can be built into their respective golf club heads in one 3D printing step, or may be formed separately from the golf club head and then permanently affixed to the golf club head at a later time. These designs illustrate the kinds of improvements to golf club head center of gravity (CG), moment of inertia (MOI), stress, acoustics (e.g., modal frequencies), ball speed, launch angle, spin rates, forgiveness, and robustness that can be made when manufacturing constraints are removed via the use of optimization software and 3D printing.

Figure 24:
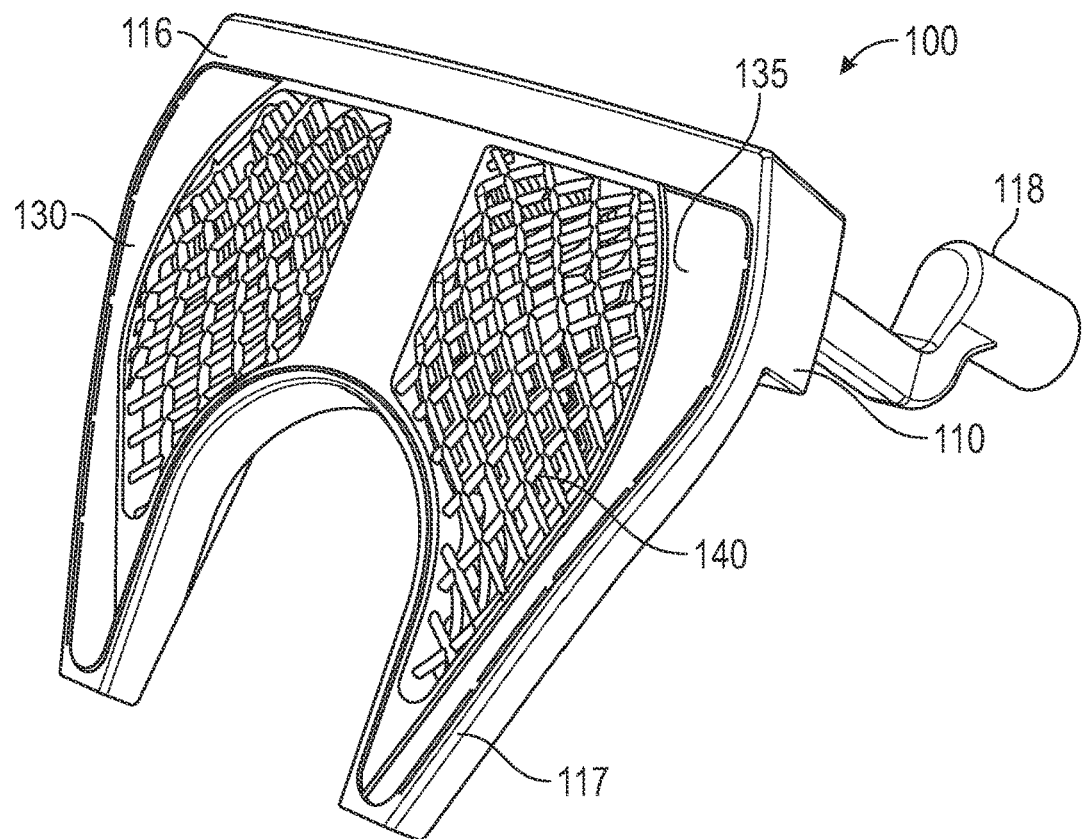
FIG. 24 is a sole perspective view of a putter head with a sole puck formed from a lattice.
Figure 25:
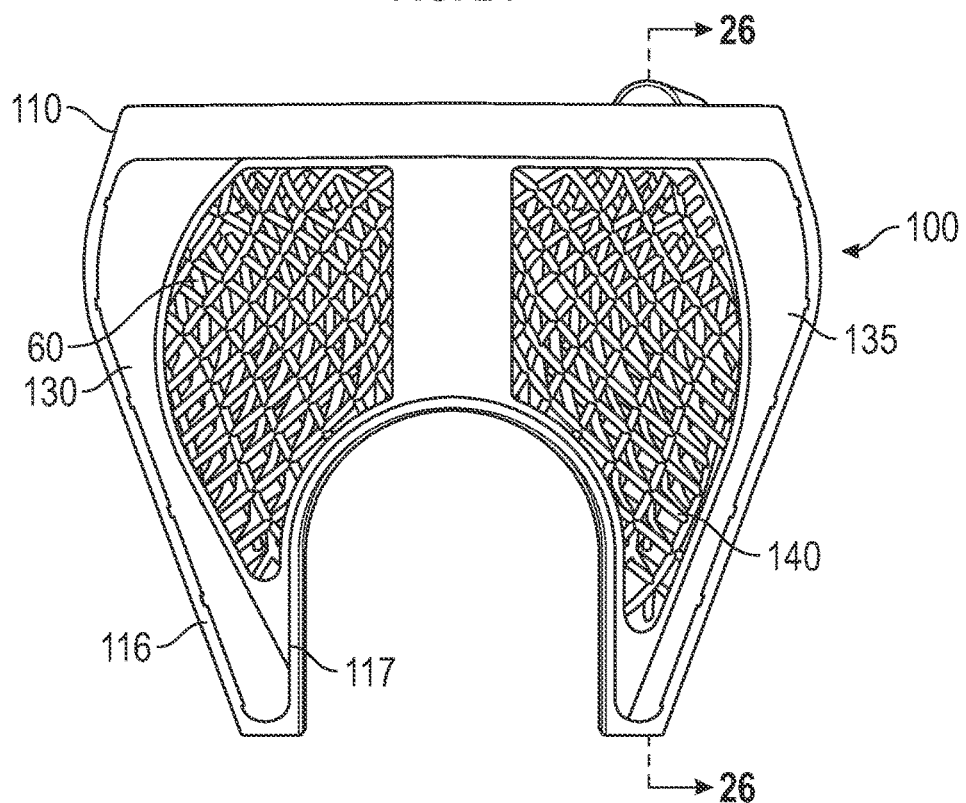
FIG. 25 is a sole plan view of the putter head shown in FIG. 24.
Figure 26:
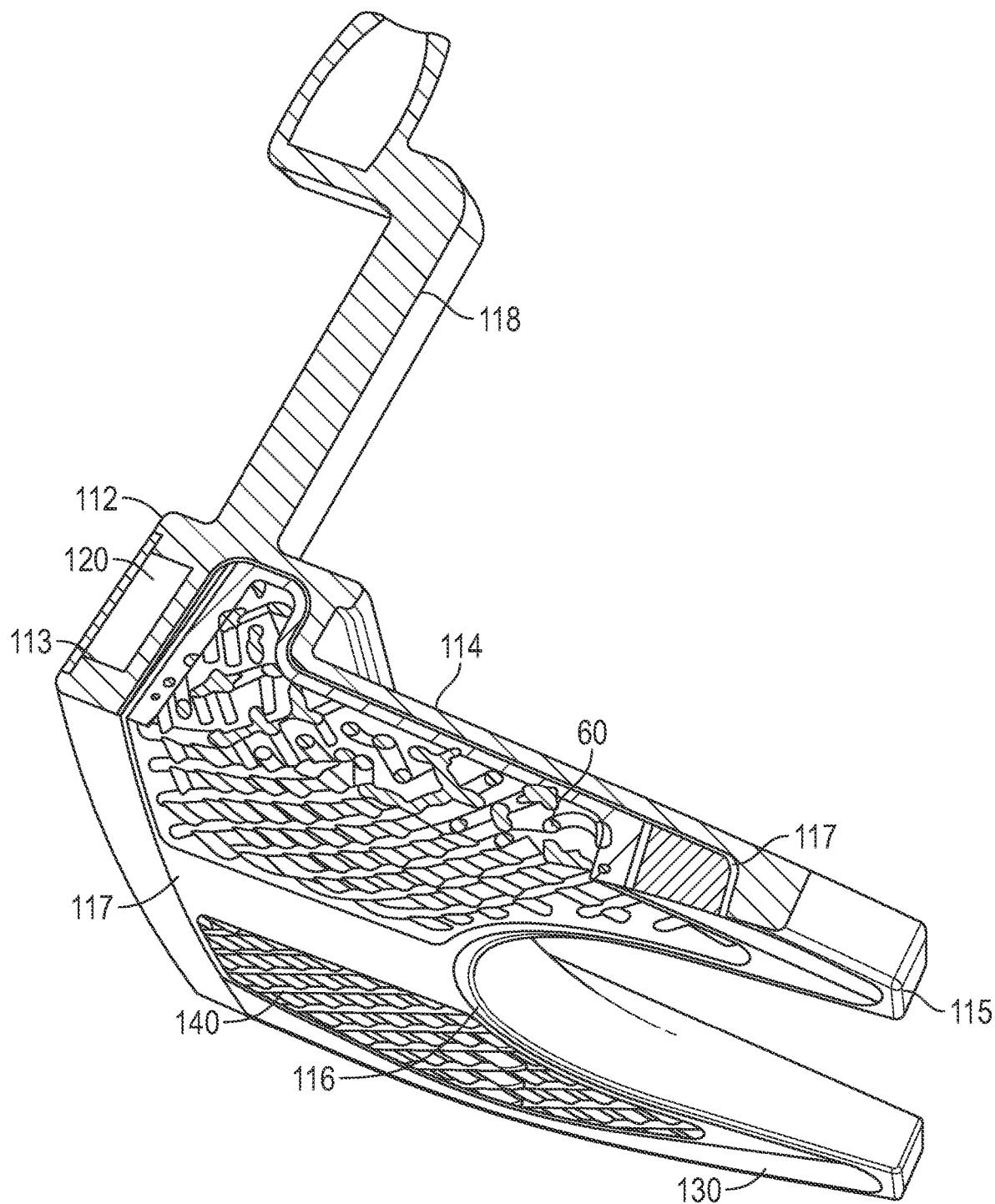
FIG. 26 is a cross-sectional view of the putter head shown in FIG. 25 taken along lines 26-26.

A first embodiment of the present invention is shown in FIGS. 23-25. The putter head 100 of this embodiment includes a body 110 with a face portion 112 and a face recess 113, a top portion 114, and a sole portion 116 with a sole recess 117, a face insert 120 disposed within the face recess 113, and sole weights 130, 135 and a sole insert or puck 140 affixed within the sole recess 117 so that the weights 130, 135 are disposed on heel and toe sides of the puck 140. The body 110 of the putter, and particularly the top portion 114, is formed of a metal alloy having a first density and has a body CG. The weights 130, 135 are preferably located as far as possible from the body CG and are composed of a metal alloy having a second density greater than the first density. While the hosel 118 of the embodiment shown in FIGS. 23-25 is formed integrally with the body 110, in other embodiments it may be formed separately from a different material and attached in a secondary step during manufacturing.

The puck 140 is printed using the binder jet process described above from at least one material with a third density that is lower than the first and second densities, and comprises one or more lattice structures 60 that fill the volume of the sole recess 117, freeing up discretionary mass to be used in high-density weighting at other locations on the putter head 100, preferably at the heel and toe edges and/or the rear edge 115. The materials from which the puck 140 may be printed include plastic, nylon, polycarbonate, polyetherimide, polyetheretherketone, and polyetherketoneketone. These materials can be reinforced with fibers such as carbon, fiberglass, Kevlar®, boron, and/or ultra-high-molecular-weight polyethylene, which may be continuous or long relative to the size of the part or the putter, or very short.

Figure 27:
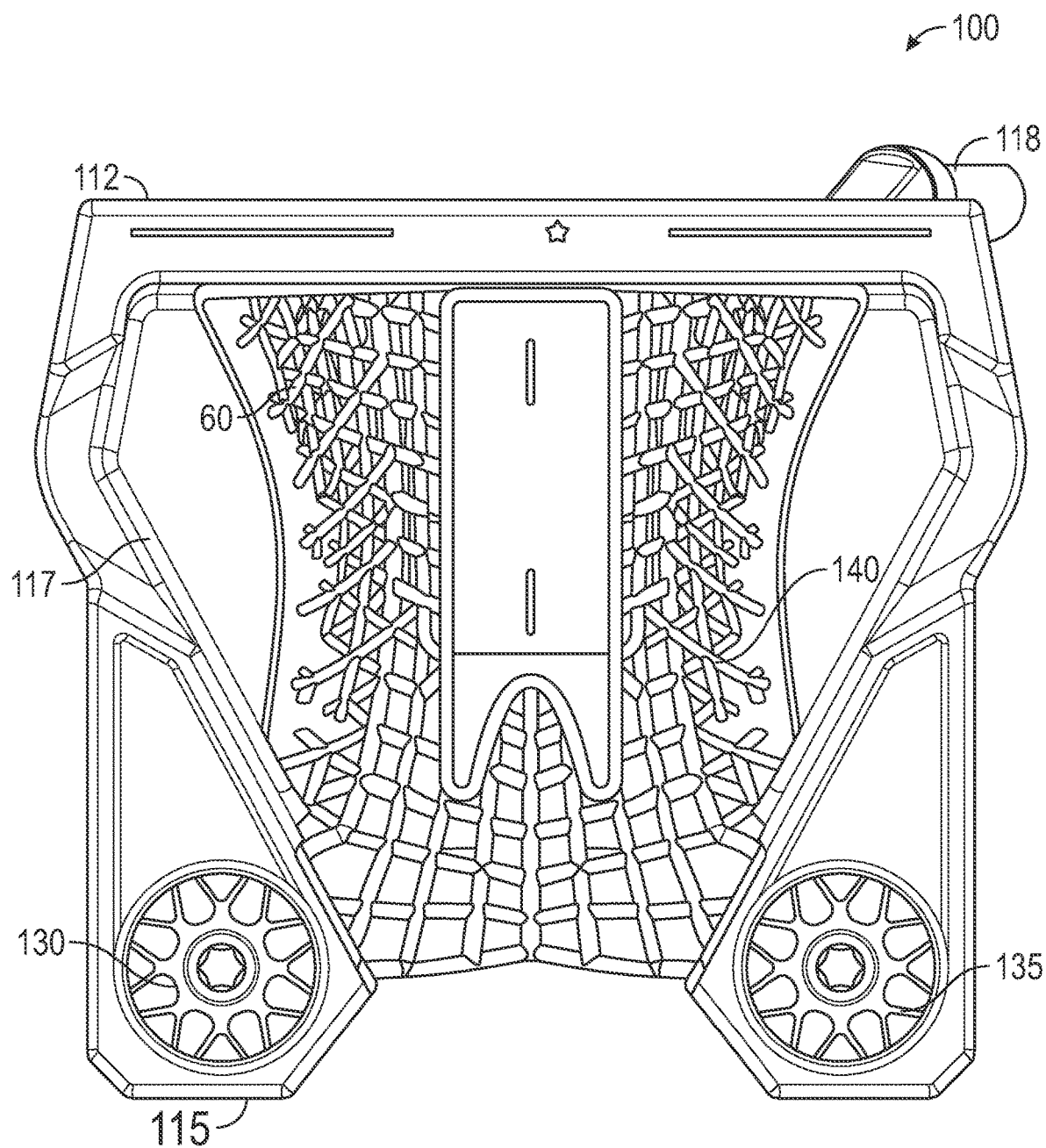
FIG. 27 is a sole plan view of another embodiment of a putter head with a sole puck formed from a lattice.

Other putter head 100 embodiments are shown in FIGS. 27-29. In these embodiments, the weights 130, 135 are threaded and are disposed at the rear edge 115 of the body, on either side and mostly behind the puck 140. In the embodiments shown in FIGS. 27 and 29, the pucks 140 have different lattice patterns 60 than the one shown in FIGS. 24-26, and do not fill the entirety of the sole recess 117. In the embodiment shown in FIG. 28, the puck 140 has another lattice pattern 60 and fills the entirety of the sole recess 117. In any of these embodiments, puck 140 may be bonded and/or mechanically fixed to the body 110. The materials, locations, and dimensions may be customized to suit particular players.

In each of these embodiments, the weights 130, 135 preferably are made of a higher density material than the body 110, though in other embodiments, they may have an equivalent density or lower density. Moving weight away from the center improves the mass properties of the putter head 100, increasing MOI and locating the CG at a point on the putter head 100 that reduces twist at impact, reduces offline misses, and improves ball speed robustness on mishits.

As shown in the iron club head 200 of FIGS. 30 and 31, the lattice structures 60 of the present invention can be formed into an insert 250 that entirely fills a rear cavity 215 of the iron body 210. In alternative embodiments, the insert 250 may fill only a portion of the rear cavity 215, depending on the cosmetic, damping, and mass property requirements of the manufacturer.

Figure 36:
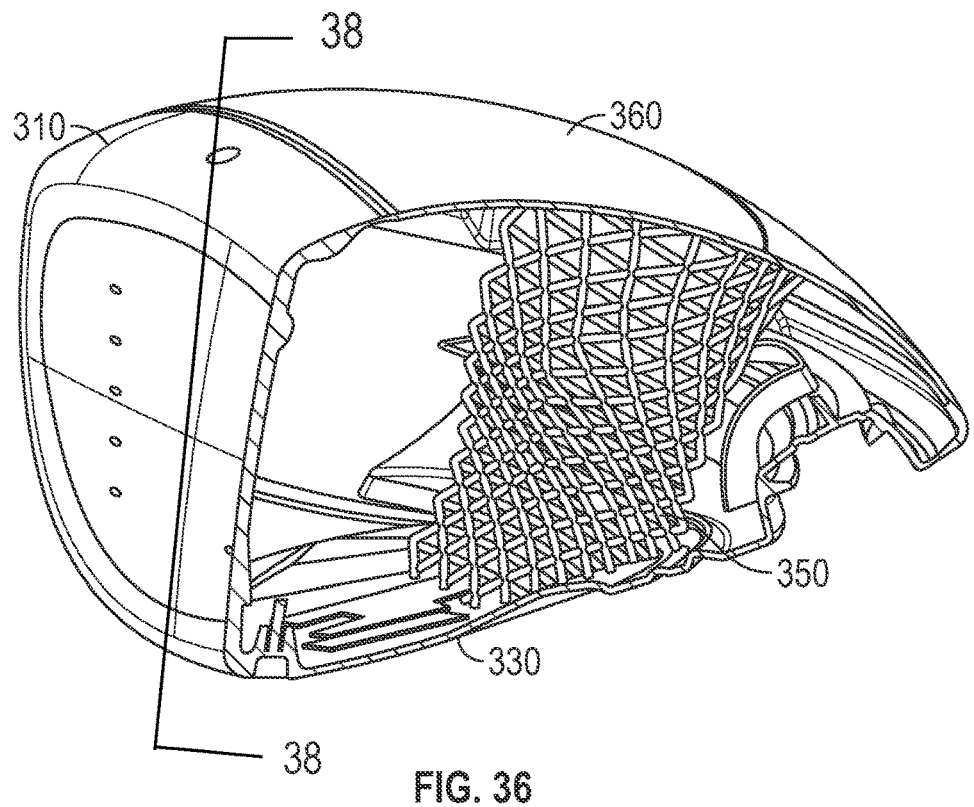
FIG. 36 is cross-sectional view of another embodiment of a driver head with a different lattice insert.

Alternatively, as shown in the driver-type golf club heads 300 of FIGS. 33-38, the lattice insert 350 of the present invention fills only a portion of the internal cavity 320. For example, in FIGS. 33-35, the lattice insert 350, which has a curved upper surface 355, contacts only an interior surface 335 of the sole 330 and is spaced from a rear face surface 305 of the body 310. As shown in FIGS. 36-38, the lattice insert 350 extends from the sole 330 to the crown insert 360 proximate a channel component 338, and has at least one curved surface 352.

In other embodiments, such as the preferred embodiment shown in FIGS. 39-40, the lattice insert 350 may be disposed on an exterior surface of the golf club head 300, like the putter embodiments in FIGS. 24-29. In the preferred embodiment, the driver type golf club head 300 comprises a sole 330 with a recess 360 proximate the aft end 336 that is divided by a support strut 370. The support strut 370 includes one or more threaded openings 372, 374 sized to receive mechanical fasteners 380 such as a bolt or a screw. The threaded openings 372, 374 may be integrally formed with the sole 330 or may be affixed to the sole 330 via separate components after the sole is manufactured. If the sole 330 is composed of a non-metal material, the threaded openings 372, 374 preferably are disposed within separate components composed of a lightweight metal material such as brass, steel, titanium alloy, or aluminum alloy.

A lattice structure 350 composed of a material having strain rate sensitive mechanical properties is sized to fit within and substantially fill the recess 360. A weight structure 390 having one or more threaded openings 392, 294 is then placed over the lattice structure 350 and affixed to the sole 330 with the mechanical fasteners 380. As shown in FIGS. 39-40, the weight 390 preferably has a truss-like structure with a plurality of through-openings 397 so that the lattice structure 350 is visible to a golfer when the golf club head 300 is fully assembled. When the mechanical fasteners 380 are tightened, the weight structure 390 compresses the lattice structure 350 until an external surface 395 of the weight structure 390 is flush with an external surface 332 of the sole 330 (or other surface of the golf club head 300). The weight 390, which spaces mass away from the surface of the golf club head 300, does not have to make direct contact with the sole 330, but may entirely rest on the lattice structure 350, thereby preventing stress from being placed on the sole by the weight 390.

The weight 390 preferably is composed of a higher density material than that of the sole 330 or other parts of the golf club head 300, such as a tungsten alloy, though in an alternative embodiment the weight 390 may composed of lower density material such as titanium alloy, steel, or aluminum alloy, and can be used predominantly for compressing the lattice structure 350 within the recess 360. In such embodiments, the heads of the mechanical fasteners 380 may be composed of higher density material to provide a desired mass.

The material from which the lattice structure 350 is manufactured makes it soft enough to conform to spacing between the weight structure 390 and the sole 330 during installation, but also rigid enough when the club head 300 impacts a ball to prevent the golf club head 300 lattice structure 350—weight structure 390 assembly from coming apart. This configuration may be used in other golf club heads, such as fairway woods, hybrids, and irons. The configuration of the preferred embodiment allows the lattice structure to act as a gasket that fills in the recess 360 and separates the weighting structure 400 from the sole 330 or other surfaces of the golf club head 300. This improves the moment of inertia and center of gravity position of the golf club head 300 while bringing acoustics to an acceptable level.

Excess Powder Removal

The increased design freedom provided by binder jetting allows for the creation of fully enclosed void volumes with a few, small vent holes for powder removal, which can later be plugged (if needed) via spot weld, threaded fastener, cap, cover, medallion, adhesive, or other means known to a person skilled in the art. The absence of metal support structures allows hollow structures like a typical driver head or fairway wood to be printed with only small vent holes for powder removal. Removal of powder reduces the overall mass of printed golf club head components and improves their structural integrity.

Each of the designs disclosed herein have a plurality of openings that permit removal of excess printing material. Another example of a golf club component with such holes is shown in FIGS. 39 and 40 with reference to a binder jet printed face insert 400 having a variable thickness pattern 410. This face insert 400 has a plurality of port holes 402 encircling the insert 400 along its outer edge 405, also known as the weld joint. The port holes 402 extend from the outer edge 405 and connect with central voids 420 where excess powder 30 is trapped after the sintering process is complete. The greater the surface area of the part, in this case the face insert 400, the greater number of port holes 420 are required to efficiently remove the excess powder 30.

Once excess powder 30 is removed from the face insert 400, preferably via shaking and polishing steps, the insert 400 can be welded into a golf club head 300 to ensure that the resulting final product does not violate any USGA rules against open holes. The port holes 402 preferably are placed in strategic locations on the face insert 400 or other parts of the golf club heads such that they fall within a weld zone, a bonding zone, under a medallion, and/or in a brazing zone. In other words, the port holes 402 are located in a region on the part where a secondary process will cover them up. This allows for the excess powder 30 to be evacuated in the raw state, and then for the port hole 402 to be covered once the raw part is made into a golf club head 300.

Entire heads, or head components, can be printed and assembled using the methods disclosed herein from materials such as steel, titanium, carbon fiber composites, and other structural materials. If golf club components are printed as disclosed herein, they can be attached to traditionally manufactured components via welding, bonding, brazing, soldering, and/or other techniques known in the art. The methods of the present invention are applicable to any type of club head, including putters, wedges, irons, hybrids, fairway woods, and drivers.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim:

1. A driver-type golf club head comprising:
    a sole comprising a recess proximate an aft edge;
    a non-metal crown;
    a metal face component affixed to the crown and to the sole opposite the aft edge;
    a binder jet printed insert with a lattice structure;
    a metal weight comprising a plurality of through-openings; and
    at least one mechanical fastener,
    wherein the sole comprises at least one support strut that divides the recess,
    wherein the at least one support strut comprises at least one threaded opening,
    wherein the insert comprises at least one curved surface,
    wherein a portion of the at least one mechanical fastener extends through the weight to engage with at least one threaded opening and affix the weight to the sole, wherein the lattice structure comprises a plurality of non-ordered beams, each of which has a cross-sectional shape selected from the group consisting of circular and elliptical, wherein the lattice structure comprises a plurality of geometric cells comprising voids, a majority of which do not include any material, wherein the insert is compressed within the recess between the sole and the weight, wherein a portion of the insert is visible through at least one of the through-openings in the weight, wherein the at least one curved surface contacts the weight, and wherein no portion of the weight contacts the sole.

2. The driver-type golf club head of claim 1, wherein each of the sole and the crown is composed of a composite material, and wherein the face component is composed of a metal material selected from the group consisting of steel and titanium alloy.

3. The driver-type golf club head of claim 1, wherein the insert is composed of a non-metal material, and wherein the lattice structure comprises a uniform final material density of at least 90%.

4. The driver-type golf club head of claim 1, wherein the weight is composed of a tungsten alloy.

5. The driver-type golf club head of claim 1, wherein the weight is composed of a material selected from the group consisting of titanium alloy, steel, and aluminum alloy.

* * * * *